(12) United States Patent
Earhart et al.

(10) Patent No.: US 7,961,301 B2
(45) Date of Patent: Jun. 14, 2011

(54) FLASH LADAR SYSTEM

(75) Inventors: Ronald P. Earhart, Westminster, CO (US); Rex M. Craig, Niwot, CO (US); Christian J. Grund, Boulder, CO (US); Ian J. Gravseth, Longmont, CO (US); Xiaopei Huang, Lafayette, CO (US); Carl S. Weimer, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 3 days.

(21) Appl. No.: 12/464,009

(22) Filed: May 11, 2009

(65) Prior Publication Data
US 2010/0208244 A1    Aug. 19, 2010

Related U.S. Application Data

(60) Provisional application No. 61/052,073, filed on May 9, 2008, provisional application No. 61/073,690, filed on Jun. 18, 2008.

(51) Int. Cl.
*G01C 3/08* (2006.01)
(52) U.S. Cl. ..................................... 356/4.01; 356/5.01
(58) Field of Classification Search ................. 356/4.01, 356/5.01
See application file for complete search history.

(56) References Cited

U.S. PATENT DOCUMENTS

| | | | |
|---|---|---|---|
| 4,022,532 A | 5/1977 | Montagnino |
| 4,201,468 A | 5/1980 | Margolis et al. |
| 5,029,023 A | 7/1991 | Bearden et al. |
| 5,091,778 A | 2/1992 | Keeler |
| 5,192,978 A | 3/1993 | Keeler |
| 5,317,376 A | 5/1994 | Amzajerdi et al. |
| 5,345,304 A | 9/1994 | Allen |
| 5,357,371 A | 10/1994 | Minott |
| 5,485,009 A | 1/1996 | Meyzonnetie et al. |
| 5,682,225 A | 10/1997 | DuBois et al. |
| 5,682,229 A | 10/1997 | Wangler |
| 5,784,023 A | 7/1998 | Bluege |
| 5,793,034 A | 8/1998 | Wesolowicz et al. |
| 5,815,250 A | 9/1998 | Thomson et al. |

(Continued)

FOREIGN PATENT DOCUMENTS

GB        2300325       10/1996

(Continued)

OTHER PUBLICATIONS

Allen et al., "Full-Scale Testing and Platform Stabilization of a Scanning Lidar System for Planetary Landing", *Space Exploration Technologies* (Wolfgang Fink, ed.), Proceedings of SPIE, vol. 6960, pp. 696004-1-696004-10 (2008).

(Continued)

*Primary Examiner* — Isam Alsomiri
(74) *Attorney, Agent, or Firm* — Sheridan Ross P.C.

(57) ABSTRACT

The present invention pertains in general to a single, integrated flash LADAR system and method. The system includes data processing hardware and software, a passive two-dimensional camera, a three-dimensional camera, a light source, and a common optical path. One or more star trackers can also be included. In addition, auxiliary components, such as an inertial measurement unit and a global positioning system receiver can be included. The system can be closely integrated with a critical algorithm suite that operates in multiple modes, in real-time to enable landing, docking, and navigation functions, such as Guidance, Navigation, and Control (GNC), Altimetry, Velocimetry, Terrain Relative Navigation (TRN), Hazard Detection and Avoidance (HDA), and dust penetration.

20 Claims, 14 Drawing Sheets

U.S. PATENT DOCUMENTS

| | | | |
|---|---|---|---|
| 5,847,816 | A | 12/1998 | Zediker et al. |
| 5,870,180 | A | 2/1999 | Wangler |
| 5,870,181 | A | 2/1999 | Andressen |
| 5,914,776 | A | 6/1999 | Streicher |
| 5,917,596 | A | 6/1999 | Jenkins et al. |
| 5,923,466 | A | 7/1999 | Krause et al. |
| 6,034,770 | A | 3/2000 | Kim et al. |
| 6,173,066 | B1 | 1/2001 | Peurach et al. |
| 6,323,941 | B1 | 11/2001 | Evans et al. |
| 6,411,871 | B1 | 6/2002 | Lin |
| 6,414,746 | B1 | 7/2002 | Stettner et al. |
| 6,434,211 | B1 | 8/2002 | Lloyd et al. |
| 6,448,572 | B1 | 9/2002 | Tennant et al. |
| 6,542,831 | B1 | 4/2003 | Moosmuller et al. |
| 6,608,669 | B2 | 8/2003 | Holton et al. |
| 6,646,725 | B1 | 11/2003 | Eichinger et al. |
| 6,657,733 | B1 | 12/2003 | Drake |
| 6,664,529 | B2 | 12/2003 | Pack et al. |
| 6,665,063 | B2 | 12/2003 | Jamieson et al. |
| 6,747,258 | B2 | 6/2004 | Benz et al. |
| 6,804,607 | B1 | 10/2004 | Wood |
| 6,943,868 | B2 | 9/2005 | Haig |
| 6,972,887 | B2 | 12/2005 | Wickham et al. |
| 7,006,203 | B1 | 2/2006 | Book et al. |
| 7,095,488 | B2 | 8/2006 | Jamieson et al. |
| 7,113,886 | B2 | 9/2006 | West |
| 7,142,981 | B2 | 11/2006 | Hablani |
| 7,224,466 | B2 | 5/2007 | Ray |
| 7,224,707 | B2 | 5/2007 | Gendron |
| 7,236,235 | B2 | 6/2007 | Dimsdale |
| 7,240,879 | B1 | 7/2007 | Cepollina et al. |
| 7,277,641 | B1 | 10/2007 | Gleckman |
| 7,342,228 | B1 | 3/2008 | O'Connell et al. |
| 7,345,743 | B1 | 3/2008 | Hartman et al. |
| 7,359,057 | B2 | 4/2008 | Schwiesow |
| 7,397,568 | B2 | 7/2008 | Bryce et al. |
| 7,406,220 | B1 | 7/2008 | Christensen et al. |
| 7,436,494 | B1 | 10/2008 | Kennedy et al. |
| 7,453,552 | B1 | 11/2008 | Miesak et al. |
| 7,580,132 | B2 | 8/2009 | Baillon et al. |
| 2002/0117340 | A1 | 8/2002 | Stettner |
| 2003/0063884 | A1 | 4/2003 | Smith et al. |
| 2004/0021852 | A1 | 2/2004 | DeFlumere |
| 2004/0130702 | A1 | 7/2004 | Jupp et al. |
| 2005/0060092 | A1 | 3/2005 | Hablani |
| 2005/0099634 | A1 | 5/2005 | Dubois et al. |
| 2006/0088946 | A1 | 4/2006 | Willson et al. |
| 2006/0114447 | A1 | 6/2006 | Harris et al. |
| 2006/0132752 | A1* | 6/2006 | Kane ............................ 356/5.02 |
| 2006/0136172 | A1 | 6/2006 | O'Kane et al. |
| 2006/0197936 | A1 | 9/2006 | Liebman et al. |
| 2007/0073486 | A1 | 3/2007 | Tillotson et al. |
| 2007/0110364 | A1 | 5/2007 | Rice et al. |
| 2007/0115541 | A1 | 5/2007 | Rogers et al. |
| 2007/0122001 | A1 | 5/2007 | Wang et al. |
| 2007/0171407 | A1 | 7/2007 | Cole et al. |
| 2007/0263676 | A1 | 11/2007 | Beukema et al. |
| 2008/0023587 | A1 | 1/2008 | Head et al. |
| 2008/0136626 | A1 | 6/2008 | Hudson et al. |
| 2008/0212328 | A1 | 9/2008 | Minano et al. |
| 2008/0273560 | A1 | 11/2008 | Stelmakh |
| 2008/0290259 | A1 | 11/2008 | Mathewson et al. |
| 2008/0316498 | A1 | 12/2008 | Drake et al. |
| 2009/0002680 | A1 | 1/2009 | Ruff et al. |
| 2009/0046289 | A1 | 2/2009 | Caldwell et al. |
| 2009/0110267 | A1 | 4/2009 | Zakhor et al. |
| 2009/0115994 | A1 | 5/2009 | Stettner et al. |
| 2009/0142066 | A1 | 6/2009 | Leclair et al. |
| 2009/0237640 | A1 | 9/2009 | Krikorian et al. |
| 2009/0273770 | A1 | 11/2009 | Bauhahn et al. |

FOREIGN PATENT DOCUMENTS

| | | |
|---|---|---|
| GB | 2306828 | 5/1997 |
| GB | 2364840 | 2/2002 |
| WO | WO 02/04982 | 1/2002 |
| WO | WO 02/065155 | 8/2002 |
| WO | WO 2007/081628 | 7/2007 |
| WO | WO 2009/133414 | 11/2009 |

OTHER PUBLICATIONS

Bakalski et al., "Real Time Processing Enables Fast 3D Imaging at Single Photon Level", *Laser Radar Technology and Applications XIII*, (Monte D. Turner, Gary W. Kamerman, ed.), Proceedings of the SPIE, vol. 6950, pp. 69500K-1-69500K-9 (2008).

Baker et al., "Advanced Infrared Detectors for Multimode Active and Passive Imaging Applications" *Infrared Technologies and Applications XXXIV* (Bjorn F. Andresen, Gabor F. Fulop, and Paul R. Norton, ed.), Proceedings of the SPIE, vol. 6940, pp. 69402L-1-69402L-11 (2008).

Brady and Schwartz, "ALHAT System Architecture and Operational Concept", Aerospace Conference, 2007 IEEE, Big Sky, MT, IEEEAC Paper # 1570, Version 4, pp. 1-13 (2007).

Cho et al., "Real-Time 3D Ladar Imaging", 35th Applied Imagery and Patern Recognition Workshop, pp. 5 (2006).

Craig et al., "Processing 3D Flash LADAR Point-Clouds in Real-Time for Flight Applications", *Sensors and Systems for Space Applications* (Richard T. Howard and Robert D. Richards, ed.), Proceedings of SPIE, vol. 6555, pp. 65550D-1-65550D-9 (2007).

Dissly et al., "Flash LIDAR Systems for Planetary Exploration", American Astronomical Society, DPS Meeting, Presentation # 40, Ithaca, NY, Bulletin of the American Astronoimical Society, vol. 41, pp. 560 (2008).

Fay et al., "Fusion of Multi-Sensor Pasive and Active 3D Imagery", *Enhanced and Synthetic Vision 2001* (Jacques G. Verly, ed.), Proceedings of SPIE, vol. 4363, pp. 219-230 (2001).

Gillula, "Data Fusion From Multiple Sensors: Real-Time Mapping on an Unmanned Ground Vehicle", 2005 SURF Final Report, California Institute of Technology, 13 pgs (2005).

Habbit et al., "Utilization of Flash LADAR for Cooperative and Uncooperative Rendezvous and Capture", Space Systems Technology and Operations (Peter Tchoryk, Jr. and James Shoemaker, ed.), Proceedings of SPIE, vol. 5088, pp. 146-157 (2003).

Hyde et al., "Mapping Forest Structure for Wildlife Habitat Analysis Using Multi-Sensor (LiDAR, SAR/InSAR, ETM+, Quickbird) Synergy", Remote Sensing of Environment, vol. 102, pp. 63-73 (2006).

De Lafontaine et al., "LAPS: The Development of a Scanning Lidar System with GNC for Autonomous Hazard Avoidance and Precision Landing"; *Spaceborne Sensors* (Robert D. Habbit, Jr. and Peter Tchoryk, Jr., ed.), Proceedings of SPIE, vol. 5418, pp. 81-93 (2004).

Lamoreux et al., "Relative Navigation Sensor for Autonomous Rendezvous and Docking", *Laser Radar Technology and Applications VIII* (Gary W. Kamerman, ed.), Proceedings of the SPIE, vol. 5086, pp. 317-328 (2003).

Lefsky et al., "Estimates of Forest Canopy Height and Aboveground Biomass Using ICESat", Geophysical Research Letters, vol. 32, L2202, 4 pages (2005).

Marino and Davis, Jr., "Jigsaw: A Foliage-Penetrating 3D Imaging Laser Radar System"; Lincoln Laboratory Journal, vol. 15, No. 1, pp. 23-36 (2005).

Oberle and Davis, "Toward High Resolution, Ladar-Quality 3-D World Models Using Ladar-Stereo Data Integration and Fusion," Army Research Laboratory, ARL-TR-3407, 37 pgs (2005).

Pack et al., "A Co-Boresighted Synchronized Ladar/EO Imager for Creating 3D Images of Dynamic Scences", *Laser Radar Technology and Applications, X* (Gary W. Kamerman, ed.), Proceedings of SPIE, vol. 5791, pp. 42-50 (2005).

Pierrottet et al., "Characterization of 3-D Imaging Lidar for Hazard Avoidance and Autonomous Landing on the Moon"; *Laser Radar Technology and Applications XII* (Monte D. Turner and Gary W. Kamerman, ed.), Proceedings of SPIE, vol. 6550, pp. 655008-1-655008-9 (2007).

Riris et al., "The Lunar Orbiter Laser Altimeter (LOLA) on NASA's Lunar Reconnaissance Orbirot (LRO) Mission", *Sensors and Systems for Space Applications* (Richard T. Howard and Robert D. Richards, ed.), Proceedings of SPIE, vol. 6555, pp. 655501-1-655501-8 (2007).

Roberts, Jr. and LeVan, "Aperture Sharing Between Low-Background Infrared Sensors and Ladar Sensors", Aerospace Applications Conference, Proceedings of the IEEE, vol. 4, pp. 495-508 (1996).

Smith et al., "Diffractive Optics for Moon Topography Mapping"; *Micro (MEMS) and Nanotechnologies for Space Applications* (Thomas George and Zhong-Yang Cheng, ed.), Proceedings of SPIE, vol. 6223, pp. 622304-1-622304-10 (2006).

Stentz et al., "Real-Time, Multi-Perspective Perception for Unmanned Ground Vehicles", Proceedings of the Association for Unmanned Vehicle Systems International, 15 pgs (2003).

Stettner et al., "Three Dimensional Flash Ladar Focal Planes and Time Dependent Imaging" Advanced Scientific Concepts, Inc., 5 pgs (Undated).

Tan and Narayanan, "Design and Performance of a Multiwavelength Airborne Polarimetric Lidar for Vegetation Remote Sensing"; Journal of Applied Optics, vol. 43, No. 11, pp. 2360-2368 (2004).

Trenkle et al., "3D Sensor Algorithms for Spacecraft Pose Determination", *Spaceborne Sensors III* (Richard T Howard and Robert D. Richards, ed.), Proceedings of SPIE, vol. 6220, pp. 62200D-1-62200D-14 (2006).

Weinberg et al., "Flash Lidar Systems for Hazard Detection, Surface Navigation and Autonomous Rendezvous and Docking", 2007 LEAG Workshop on Enabling Exploration, 2 pgs (2007).

Yoon et al., "High Frequency Attitude Motion of ICESat", *Advances in Astronautical Sciences* (David A. Vollado, Michael J. Gabor and Prasun N. Desai ed.), vol. 120: Spaceflight Mechanics, Part 1, pp. 117-131 (2005).

Robert C. Fenton, "A LADAR-Based Pose Estimation Algorithm for Determining Relative Motion of a Spacecraft for Autonomous Rendezvous and Dock", Master of Science thesis, Utah State University, 90 pages (2008).

Chen et al., "RANSAC-Based DARCES: A New Approach to Fast Automatic Registration of Partially Overlapping Range Images", IEEE Transactions on Pattern Analysis and Machine Intelligence, vol. 21, No. 11, 6 pages (Nov. 1999).

Vasile et al., "Pose-Independent Automatic Target Detection and Recognition Using 3D Laser Radar Imagery", Lincoln Laboratory Journal, vol. 15, No. 1, 18 pages (2005).

Ruel et al., "Field Testing of a 3D Automatic Target Recognition and Pose Estimation Algorithm", Automatic Target Recognition XIV, SPIE vol. 5426, 10 pages (2004).

Allen et al., "Rendezvous Lidar Sensor System for Terminal Rendezvous, Capture, and Berthing to the International Space Station", Sensors and Systems for Space Applications II, SPIE vol. 6958, 8 pages (2008).

Jasiobedzki et al., "Autonomous Satellite Rendezvous and Docking Using LIDAR and Model Based Vision", Spaceborne Sensors II, SPIE vol. 5798, 12 pages (2005).

Fenton et al., "Simulation Tests of a Lidar-based Spacecraft Pose Determination Algorithm", Sensors and Systems for Space Applications, SPIE vol. 6555, 11 pages (2007).

Ruel et al., "Real-Time 3D Vision Solution for On-Orbit Autonomous Rendezvous & Docking", Spaceborne Sensors III, SPIE 6220, 11 pages (2006).

Trenkle et al., "3-D Sensor Algorithms for Spacecraft Pose Determination", Spaceborne Sensors III, SPIE vol. 6220, 14 pages (2006).

Wikipedia, "RANSAC", available at http://en.wikipedia.org/wiki/RANSAC, 5 pages (2009).

Gravseth et al., U.S. Appl. No. 12/647,883, Entitled "Method and Apparatus for Lidar Target Identification and Pose Estimation", filed Dec. 28, 2009, 35 pages.

Brian F. Aull et al., "Geiger-Mode Avalanche Photodiodes for Three-Dimensional Imaging", Lincoln Laboratory Journal, vol. 13, No. 2 (2002).

Didier Bruneau, "Mach-Zehnder Interferometer as a Spectral Analyzer for Molecular Doppler Wind Lidar", Applied Optics, vol. 40, No. 3, pp. 391-399 (2001).

Didier Bruneau and Jacques Pelon, "Simulation and Measurement of Particle Backscattering & Extinction Coefficient & Wind Velocity by Lidar with a Mach-Zehnder Interferometer: Principle of Operation & Performance Assessment", Applied Optics, vol. 42, No. 6, pp. 1101-1114 (2003).

Pierre Connes and Guy Michel, "Astronomical Fourier Spectrometer", Applied Optics, vol. 14, No. 9, pp. 2067-2084 (1975).

Degnan, John J., "Photon-Counting Multikilohertz Microlaser Altimeters for Airborne and Spaceborne Topographic Measurements", Journal of Geodynamics, vol. 34, pp. 503-549 (2002).

T.S. Durrani and C.A. Greated, "Spectral Analysis and Cross-Correlation Techniques for Photon Counting Measurements on Fluid Flows", Applied Optics, vol. 14, No. 3, pp. 778-794 (1975).

W.A. Gault, et al., "ERWIN: An E-Region Wind Interferometer", Applied Optics, vol. 35, No. 16, pp. 2913-2922 (1996).

Gentry, Bruce et al., "The Tropospheric Wind Lidar Technology Experiment (TWiLiTE): An Airborne Direct Detection Doppler Lidar Instrument Development Program", available at http://esto.nasa.gov/conferences/estc2006/papers/b8p2.pdf.

Pierre Jacquinot, "*The Luminosity of Spectrometers with Prisms, Gratings, or Fabry-Perot Etalons*", Journal of the Optical Society of America, vol. 44, No. 10, pp. 761-765 (1954).

V. Nirmal Kumar and D. Narayana Rao, "*Determination of the Instrument Function of a Grating Spectrometer by Using White-Light Interferometry*", Applied Optics, vol. 36, No. 19, pp. 4535-4539 (1997).

Lieber, Mike et al., "Development of a Validated End-to-End Model for Space-Based Lidar Systems", *Lidar Remote Sensing for Environmental Monitoring VIII* (Singh, Upendra N. ed.), Proceedings of the SPIE, vol. 6681, 66810F (2007).

Lieber, Mike et al., "System Verification of the JMEX Mission Residual Motion Requirements with Integrated Modeling", *UV/Optical/IR Space Telescopes: Innovative Technologies and Concepts II* (MacEwen, Howard A. ed.), Proceedings of the SPIE, vol. 5899, 589901, pp. 1-12 (2005).

Lieber, Mike et al., "Integrated System Modeling for Evaluating the Coronagraph Approach to Plant Detection", *High-Contrast Imaging for Exo-Planet Detection* (Schultz, Alfred B. ed.), Proceedings of the SPIE, vol. 4860 (2002). (Abstract only).

W.T. Mayo, Jr., "Photon Counting Processor for Laser Velocimetry", Applied Optics, vol. 16, No. 5, pp. 1157-1162 (1977).

G.A. Morton, "Photon Counting", Applied Optics, vol. 7, No. 1, pp. 1-10 (1968).

Rabinovich, W.S. et al., "45 Mbps Cat's Eye Modulating Retro-Reflector Link Over 7 Km", *Free-Space Laser Communications VI*, Proceedings of the SPIE, vol. 6304, pp. 63040Q (2006). (Abstract only).

Robert L. Richardson and Peter R. Griffiths, "Design and Performance Considerations of Cat's Eye Retroreflectors for Use in Open-Path Fourier-Transform-Infrared Spectrometry", Applied Optics, vol. 41, No. 30, pp. 6332-6340 (2002).

J. Ring and J.W. Schofield, "Field-Compensated Michelson Spectrometers", Applied Optics, vol. 11, No. 3, pp. 507-516 (1972).

Gordon G. Shepherd et al., "WAMDII: Wide-Angle Michelson Doppler Imaging Interferometer for Spacelab", Applied Optics, vol. 24, No. 11, pp. 1571-1584 (1985).

Gordon G. Shepherd et al., "WINDII—The Wind Imaging Interferometer for the Upper Atmosphere Research Satellite", Geophys. Res. vol. 98, No. D6, pp. 10,725-10,750 (1993).

Vallerga, John et al., "Noiseless, High Frame Rate (>KHz), Photon Counting Arrays for Use in the Optical to the Extreme UV", University of California, Berkeley—Sciences Laboratory and University of Geneva, Switzerland, available at http://www.ssl.berkeley.edu/~mcphate/AO/ao_medipix.html (2004-present).

Shiquang Wang, Gordon G. Sheperd, and William E. Ward, "Optimized Reflective Wide-Angle Michelson Phase-Stepping Interferometer", Applied Optics, vol. 39, No. 28, pp. 5147-5160, (2000).

Grund, et al. "Enabling Characteristics of Optical Autocovariance Lidar for Global Wind and Aerosol Profiling", AGU, American Geophysical Union, Fall Meeting, San Francisco, CA (Dec. 16, 2008).

Grund, Chris, "An Alternative Direct Detection Approach to Doppler Winds that is Independent of Aerosol Mixing Ratio and Transmitter Frequency Jitter", Space Winds Lidar Working Group, Miami, FL (Feb. 8, 2007).

Grund, Christian et al., "Optical Autocovariance Wind Lidar and Performance from LEO", 14th Coherent Laser Radar Conference, Snowmass, CO (Jul. 7, 2007).

Grund, Christian et al., "Supporting NOAA and NASA High-Performance Space-Based DWL Measurement Objectives with a Minimum Cost, Mass, Power, and Risk Approach Employing Optical Autocovariance Wind Lidar (OAWL)", Space Winds Lidar Working Group, Monterrey, CA (Feb. 6, 2008).

Grund, Christian, et al., Presentation Entitled "Simultaneous Profiling of Aerosol Optical Properties, Gas Chemistry, and Winds with Optical Autocovariance Lidar", 24th ILRC Conference (Jun. 23, 2008).

Chris Grund, "Lidar Wind Profiling from Geostationary Orbit Using Imaging Optical Autocovariance Interferometry", Space Winds Lidar Working Group, Snowmass, CO (Jul. 17, 2007).

Grund, et al., Poster and Paper Entitled "Optical Autocovariance Wind Lidar (OAWL) for Efficient Space-Based Direct-Detection High-Resolution Aerosol Backscatter Winds", International Laser Radar Conference, Boulder, CO (Jun. 24, 2008).

Grund et al., Poster Entitled "Optical Autocovariance Wind Lidar (OAWL) for Efficient Space-Based Direct-Detection High-Resolution Aerosol Backscatter Winds", presented at the Coherent Laser Radar Conference, Jul. 2007, presented at the Working Group on Space-based Lidar Winds, Feb. 2008, and presented at the International Laser Radar Conference, Boulder, CO, Jun. 23-27, 2008, 1 page.

Grund, Christian J., Power Point Presentation Entitled "Optical Autocovariance: Alternative Direct Detection Approach to Doppler Winds that is Independent of Aerosol Mixing Ratio and Transmitter Frequency Jitter", presented at the Working Group Conference on Space-Based Lidar Winds, Feb. 6-9, 2007, 12 pages.

Grund et al., Presentation Entitled "Optical Autocovariance Wind Lidar and Performance from LEO", presented at the Coherent Laser Radar Conference, Jul. 11, 2007, 30 pages.

Grund et al. "Simultaneous Profiling of Aerosol Optical Properties, Gas Chemistry, and Winds with Optical Autocovariance Lidar", Paper 1 of 2 presented at the 24th International Laser Radar Conference, Jun. 23-27, 2008, 5 pages.

Grund et al., "Optical Autocovariance Wind Lidar (OAWL) for Efficient Space-Based Direct-Detection High-Resolution Aerosol Backscatter Winds", Paper 2 of 2 presented at the 24th International Laser Radar Conference, Jun. 23-27, 2008, 5 pages.

International Search Report and Written Opinion for International Patent Application Serial No. PCT/US2010/021213, mailed Mar. 22, 2010, 8 pages.

Kasten, et al., "Fabrication and Characterization of Individually Addressable Vertical-Cavity Surface-Emitting Laser Arrays and Integrated VCSEL/PIN Detector Arrays", Proceedings of SPIE, vol. 6484, 64840C, 2007.

Aerius Photonics website, "Aerius NIR/SWIR Illuminators" product sheet, available at http://www.aeriusphotonics.com/datasheets.html, 2 pages (2009).

International Search Report and Written Opinion for International Patent Application Serial No. PCT/US2010/033559, mailed Jul. 6, 2010, 9 pages.

U.S. Appl. No. 12/357,251, filed Jan. 21, 2009.

U.S. Appl. No. 12/857,354, filed Aug. 16, 2010.

Notice of Allowance and Fee(s) Due for U.S. Appl. No. 12/390,226, mailed Dec. 17, 2010, 23 pages.

* cited by examiner

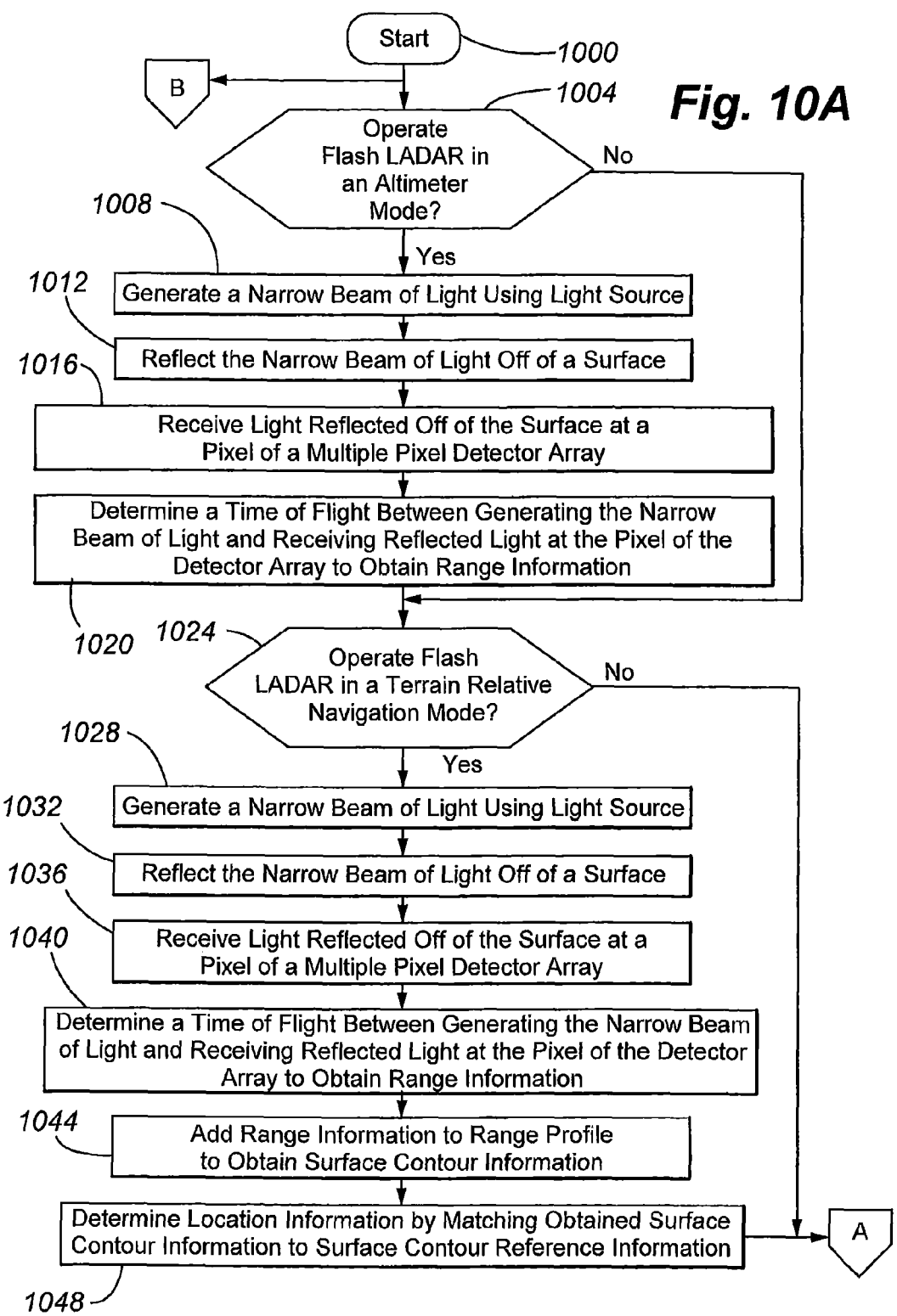

FLASH LADAR SYSTEM

CROSS REFERENCE TO RELATED APPLICATIONS

This application claims the benefit of U.S. Provisional Application No. 61/052,073, filed May 9, 2008, and this application also claims the benefit of U.S. Provisional Application No. 61/073,690, filed Jun. 18, 2008, the entire disclosures of which are hereby incorporated herein by reference in their entirety.

FIELD

A flash LADAR system and method is disclosed. More particularly, a flash LADAR system and method integrated with a critical algorithm suite that operates in multiple modes and in real-time is disclosed.

BACKGROUND

Space operations such as rendezvous, docking, and proximity operations can be very challenging and are complicated by the precise nature and errors of the measurements for navigating and controlling the relative motion and orbits between the spacecrafts or other space targets of interest. These operations use navigation sensors that typically consist of multiple, bulky components. The typical sensor may include various types of instruments to provide measurements for the component systems, such as visible and infrared sensors, laser range finders, LADARs (laser detection and ranging), inertial measurement units, and GPS (global positioning system) receivers.

However, for many missions, the navigation sensors have extremely tight size and weight constraints and must operate either manually or autonomously to accomplish their mission. Thus, a new generation of navigation sensors is needed to address the above problems for relative navigation, attitude determination, and pointing related to rendezvous, docking, and proximity operations. Potential benefits from utilizing these new navigation sensors include reduced crew training, reduced reliance on ground systems, and more operational flexibility. New sensors can also reduce the need to augment target spacecraft with cooperative devices and thus provide for greater flexibility and enhanced mission success.

Future lunar, terrestrial, and other planetary exploration missions will require safe and precision landing at scientifically interesting sites which may be near hazardous terrain features such as craters or pre-deployed assets. This will require systems that can provide the critical and safe landing functions such as Guidance, Navigation, and Control (GNC), Altimetry, Velocimetry, Terrain Relative Navigation (TRN), Hazard Detection and Avoidance (HDA), and dust penetration. Typically, these functions require separate, dedicated sensors for each function leading to large, complex, heavy, costly, and power-hungry systems that fail to meet stringent mission size and weight constraints.

For meeting the needs of these missions, 3-dimensional imaging sensors, particularly Laser Detection and Ranging (LADAR, also known as Light Detection and Ranging (LIDAR)) sensors, have emerged as the leading candidate. However, present LADAR solutions typically involve two LADAR sensors. One of the LADAR sensors uses the complex coherent LADAR technique to provide ranging, descent and lateral velocity information while the other LADAR provides terrain aided navigation and HDA using a flash 3-dimensional LADAR. However, the use of multiple sensors adds complexity to the landing function. Other LADAR solutions use inefficient scanning LADAR Thus, a new generation of flash LADAR-based planetary landing system is needed to address the above problems and enable a number of planetary landing functions such as GNC, Altimetry, Velocimetry, TRN, HDA, and dust penetration to be accomplished in a single unit, significantly reducing payload size, weight, power, and cost.

SUMMARY

As can be appreciated by one of skill in the art, a LADAR is a laser detection and ranging system. As can also be appreciated by one of skill in the art, a LIDAR or light detection and ranging system is essentially equivalent to a LADAR system. In particular, both LADAR and LIDAR systems use a pulsed light source to produce light that is reflected from a target to obtain range information. Moreover, the term LADAR is commonly used in connection with systems having defense applications, while the term LIDAR is commonly used in connection with non-military applications. However, in the present description, no distinction between the terms is made. Therefore, for ease of description and consistency, the term LADAR is used throughout this description. However, it should be understood that the term LADAR is also intended to encompass LIDAR, to the extent that a distinction between the terms might otherwise be drawn.

In accordance with embodiments of the present invention, a single, Flash LADAR-based planetary landing system packaged as a single unit comprising data processing hardware and software, a passive camera, a common optical path, variable Field of View (FOV) optical system, and/or auxiliary components (e.g., Global Positioning System (GPS) and/or Inertial Measurement Unit (IMU)) is provided. Moreover, the LADAR can comprise a critical algorithm suite that operates in multiple modes, in real-time (e.g., Real-Time Flash LADAR Image Processor (FLIPR) Field Programmable Gate Array (FPGA)), and in a progressing and/or parallel manner to enable all the essential, safe planetary landing functions such as GNC, Altimetry, Velocimetry, TRN, HDA, and dust penetration.

In accordance with other embodiments of the present invention, a single, integrated real-time navigation vision sensor assembly for providing multiple functions such as rendezvous, docking, landing and proximity operations is provided. The assembly includes a flash LADAR active illumination system integrated with real-time processing hardware and algorithms, such as a FPGA, to produce real-time, movie-like (e.g., 30 frames per second) three-dimensional image data or information reflected from a target or a scene. The assembly also includes a passive camera that is co-boresighted with the flash LADAR. The flash LADAR and passive camera use a common optical aperture for passive imaging of the target or scene, and for receiving reflected laser light. The assembly also includes a data processing unit (DPU), multiple algorithms, common interfaces, control electronics, and mechanical support and other auxiliary subsystems for supporting rendezvous, docking and proximity operations. Although useful in connection with space operations, embodiments of the present invention have application in other environments, for example, aircraft landing operations. The passive camera may operate at visible, infrared and/or UV wavelengths. The DPU can accept individual sensor data, process that data to perform geometric and image correction, perform data fusion between sensor data, format raw data and data products, provide draping of the LADAR 3D image with the passive image or provide alignment correction between the LADAR 3D image and the passive image, process algorithms, and communicate data to external receivers. Moreover, the DPU may include a number of FPGAs that produce real time target images (e.g., movies). The algorithms may consist of guidance and control (G&C) algorithms that process LADAR data in real time, identify targets with a non-iterative closed form solution, and produce pose estimates. For a docking scenario, the LADAR algorithms produce estimates of the relative velocity, velocity, attitude and/or rate between the two vehicles. In a landing scenario, the algorithms produce estimates of the vehicles' position, altitude, velocity, attitude and/or rate relative to the imaged surface. The objects in the optical path may be fixed or variable. The LADAR and the passive camera can share the DPU, power management, thermal interface, housing and mechanical interface, and/or communications interfaces. A star tracker may also be provided in addition to a passive camera and a flash LADAR. In accordance with still other embodiments, the passive camera may comprise a star tracker oriented in a direction that is orthogonal or otherwise not aligned with the boresight of the flash LADAR. In accordance of still other embodiments of the present invention, the passive camera may include two or more focal planes optimized for different wavelengths or functions, for example, visible, infrared and star tracker functions. The passive camera may alternatively or additionally comprise a spectral imaging system.

In accordance with further embodiments of the present invention, the passive sensor is a low-light imager (LLI) integrated with the flash LADAR. The camera is co-boresighted with the LADAR, and shares the LADAR optical aperture, affording a considerable savings in system weight, volume, and cost. In accordance with further embodiments of the present invention, the passive camera may be sensitive to visible, infrared, and/or UV wavelengths. The DPU accepts individual sensor data, processes sensor data to perform geometric and image corrections, performs data fusion between sensor data, formats raw data and data products, provides draping of the flash LADAR 3-D image with the passive image or provides alignment corrections between the flash LADAR 3-D image and the passive image, processes algorithms, and communicates data to external receivers. In accordance with embodiments of the present invention, the DPU consists of FPGA's that produce real-time target images (e.g., movies), and the algorithms consist of guidance and control (G&C) algorithms that process flash LADAR data in real time, identify targets with a non-iterative closed form solution, and produce pose estimates. For a docking scenario, the flash LADAR algorithms produce estimates of the relative position, velocity, attitude and rate between the two vehicles. In a landing scenario, the algorithms produce estimates of the vehicle's position, velocity, attitude and rate relative to the imaged surface. In accordance with further embodiments of the present invention, an algorithm suite that works in conjunction with flash LADAR is provided to correlate range data in various modes against a known surface feature database for TRN at high altitudes and HDA at low altitudes.

Embodiments of the invention allow optics in the optical path to be fixed or variable. The flash LADAR and passive camera share the DPU, common power management, common thermal interface, common housing and mechanical interface. A common interface is used to convey passive and active camera data, data fusion products, and system health/status/control/and test communications. The passive camera may comprise a star tracker oriented in an orthogonal or other direction from the flash LADAR FOV. The DPU may additionally contain star maps allowing absolute determination of the flash LADAR image. The passive camera may consist of two or more focal planes optimized for different wavelengths or functions (i.e. visible, IR images and star tracker), and/or the passive camera may comprise a spectral imaging system.

Additional features and advantages of embodiments of the present invention will become more readily apparent from the following description, particularly when taken together with the accompanying drawings.

BRIEF DESCRIPTION OF THE DRAWINGS

FIGS. 10A and 10B present a flowchart depicting aspects of the operation of a flash LADAR based system in accordance with embodiments of the present invention.

DETAILED DESCRIPTION

Figure 1:
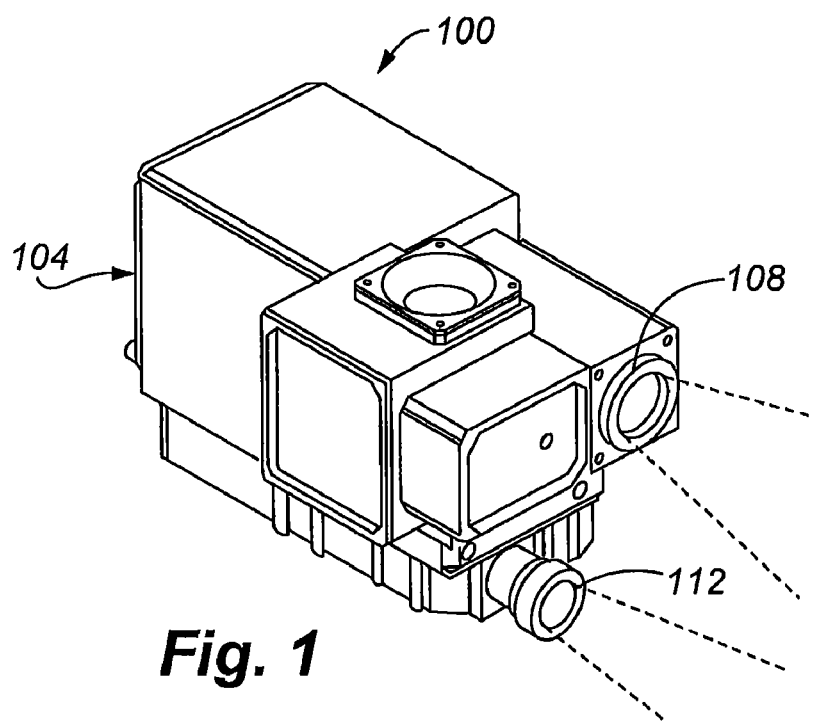
FIG. 1 depicts a flash LADAR system in accordance with embodiments of the present invention.

FIG. 1 depicts a LADAR system 100 in accordance with embodiments of the present invention. In general, the LADAR system 100 features a shared enclosure or frame 104 that carries or encloses a shared receive aperture 108. The LADAR system 100 may also include transmit optics 112. A two-dimensional focal plane array, a three-dimensional focal plane array, shared electronics and other components may also be located in or associated with the housing 104. In accordance with embodiments of the present invention, the housing or frame 104 is athermal for accurate alignment of optical components despite temperature changes. In addition, the optical components may be rigidly mounted to the frame or enclosure 104, to provide accurate alignment, even in the presence of vibration.

Figure 2:
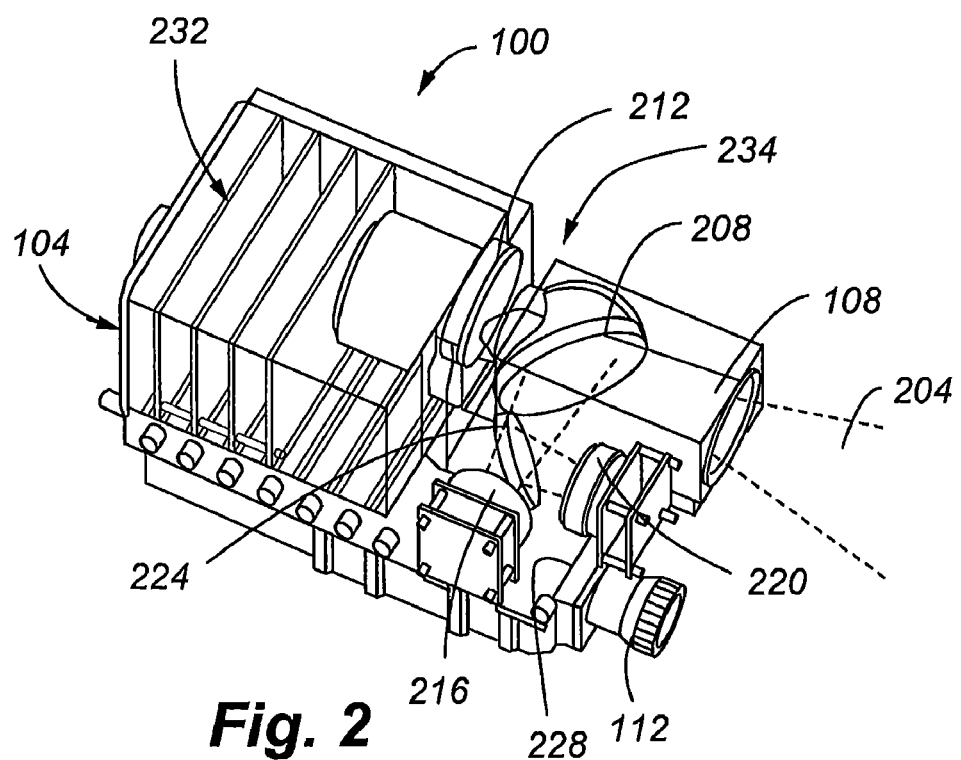
FIG. 2 depicts internal components of the flash LADAR system of FIG. 1.

FIG. 2 depicts the interior of a flash LADAR system 100 in accordance with embodiments of the present invention. As shown, the shared receive aperture 108 gathers light from within a receive cone or field of view (FOV) 204 and passes that light to a dichroic mirror 208. As can be appreciated by one of skill in the art, the dichroic mirror transmits light within at least a first range of wavelengths, and reflects light within at least a second range of wavelengths. For example, the dichroic optic or mirror 208 may transmit light at infrared wavelengths, in accordance with the laser wavelength, and reflect light at shorter wavelengths. The transmitted light is passed to a three-dimensional or LADAR focal plane array (FPA) 212. Light reflected by the dichroic mirror 208 may be directed to a two-dimensional or high resolution camera focal plane array (FPA) 216 and/or a star tracker focal plane array (FPA) 220. Where both a high resolution camera FPA 216 and a star tracker FPA 220 are provided, a beam splitting optic 224 may be provided. In accordance with embodiments of the present invention, the beam splitting optic 224 does not perform any wavelength discrimination function. Accordingly, the beam splitting optic 224 may comprise a partially reflective mirror. In accordance with other embodiments, the beam splitting optic 224 may discriminate based on wavelength to provide a spectrally selective distribution of visible wavelength light between the high resolution camera FPA 216 and the star tracker FPA 220.

The transmit optics 112 are generally associated with a laser or other light source 228. As shown in the example configuration, the transmit optics 112 may be provided as an optical assembly that is separate from the receive aperture 108. A desired alignment between the receive aperture 108 and the transmit optics 112 is facilitated by including both of these components within the common enclosure 104, and/or by rigidly mounting the receive aperture 108 optics and the transmit optics 112 to the enclosure 104. As can be appreciated by one of skill in the art, the light source 228 may comprise a laser capable of providing precisely timed pulses of light at one or more selected wavelengths.

The shared enclosure 104 can also provide a housing or platform for shared electronics 232. As depicted, the shared electronics 232 may be provided as one or more circuit boards or elements. Also as shown, the shared electronics 232, and in particular processing components included in the shared electronics 232 may be located in close proximity to the various focal plane arrays 212, 216 and 220, to facilitate real time processing of data collected by those focal plane arrays 212, 216 and 220. Moreover, in accordance with embodiments of disclosed invention, processing components included in the shared electronics 232 may be in close proximity to the three-dimensional FPA 212. In addition to one or more processors, the shared electronics 232 can comprise memory, thermal control components, control electronics, and other components. Together, the shared receive aperture 108, the transmit optics 212, the three-dimensional FPA 212, the light source 228, and the shared electronics 232 implement a flash LADAR 234.

Figure 3A:
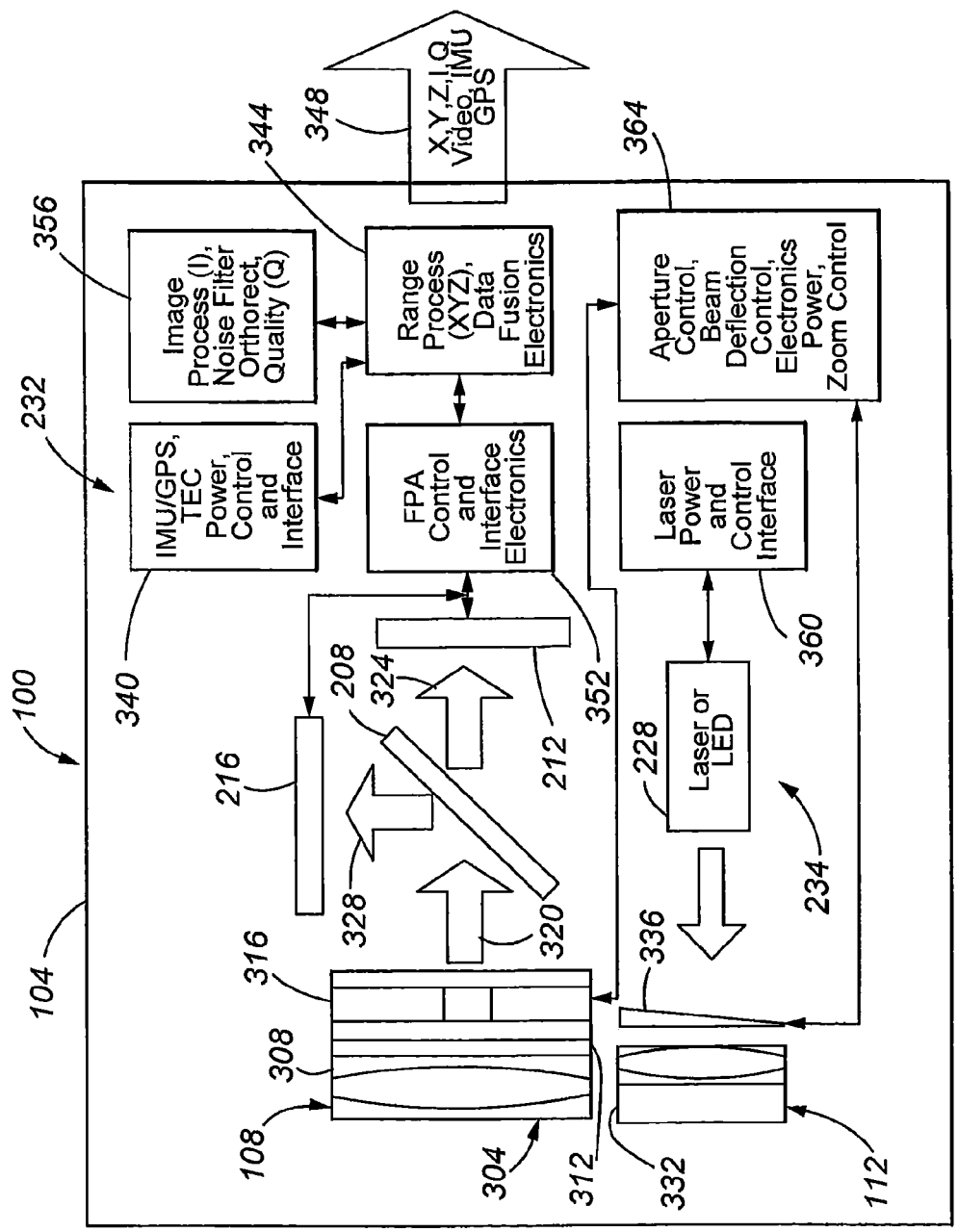
FIG. 3A is a block diagram depicting components of a flash LADAR in accordance with embodiments of the present invention.

FIG. 3A is a block diagram depicting components of the LADAR system 100 in accordance with embodiments of the present invention. As shown, the various components are housed within or associated with a common enclosure or frame 104. The shared receive aperture 108 generally comprises receive optics 304 that can include refractive and/or reflective optics 308. The shared receive optics 308 can be implemented as a telescope or camera lens. As can be appreciated by someone skilled in the art, the receive optics 308 can also implement motorized or otherwise actuated zoom optical elements that allow dynamic adjustment of the receiver field of view under control of the processor in the shared electronics 232. In addition, the receive optics can include filters 312, such as background rejection filters. Background rejection filters 312 can comprise coded windows designed to transmit a very narrow wavelength band that encompasses the wavelength of the signal light, in order to discriminate the signal light from background light. The receive aperture optics 304 can additionally incorporate aperture control and/or intensity control elements 316. For example, an aperture control 316 can comprise a motorized or otherwise actuated iris under the control of a processor provided by the shared electronics 232 that monitors the intensity of received light and that also adjusts the aperture according to the required depth of field.

Signal light 320 collected by the shared receive optics 304 is received at the dichroic mirror or splitter 208. The dichroic mirror 208 divides the received signal light 320 into first 324 and second 328 components. In accordance with embodiments of the disclosed invention, components of the received signal light 320 that comprise relatively long wavelengths are transmitted by the dichroic mirror 208, and therefore comprise the first signal component 324. Components of the received signal 320 that comprise relatively short wavelengths are reflected by the dichroic mirror 208 as the second signal component 328. In accordance with other embodiments, the dichroic element 208 can transmit shorter wavelength light and reflect longer wavelength light.

The first signal component 324 is received at the three-dimensional or LADAR focal plane array 212. The three-dimensional FPA 212 may comprise a sensor array with a readout integrated circuit (ROIC) that senses photons transmitted by the transmit optics 112 that have been reflected from a target or volume of interest and collected by the shared receive optics 304. As can be appreciated by one of skill in the art, the arrival times of photons at the pixels of the three-dimensional FPA 212 are recorded in order to obtain per pixel range information.

The second component 328 of the received signal light 320 is reflected to the two-dimensional FPA 216. The two-dimensional FPA 216 can comprise a triggered digital camera or a video camera sensitive to any wavelength outside the narrow band used in connection with the flash LADAR FPA 212 (i.e., the wavelength of the light transmitted by the transmit optics 112). As can be appreciated by one of skill in the art, wavelength selectivity can be provided, at least in part, by the use of the dichroic mirror 208. Additional filters can also be used.

Figure 3B:
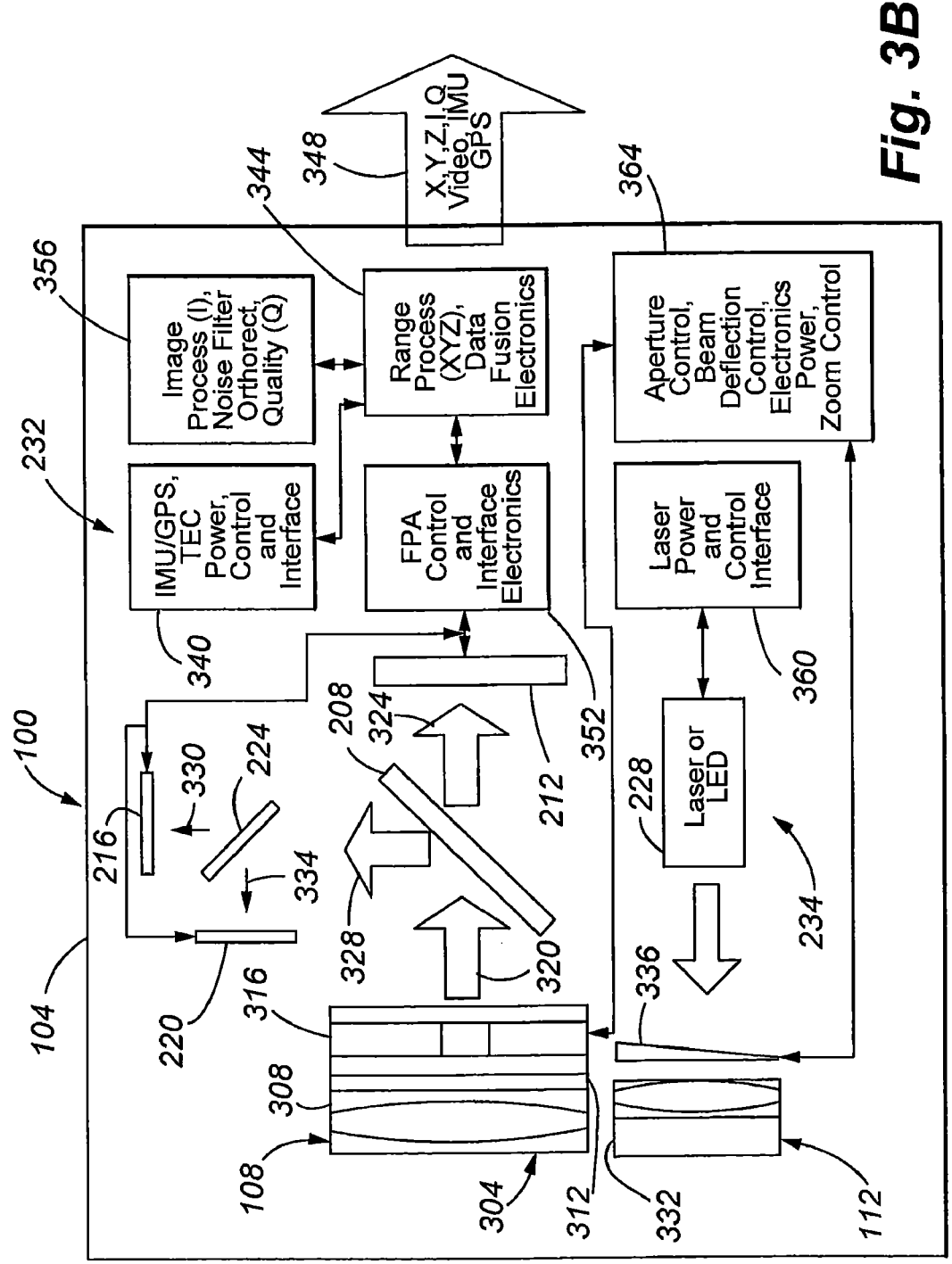
FIG. 3B is a block diagram depicting components of a flash LADAR in accordance with other embodiments of the present invention.

With reference now to FIG. 3B, in accordance with other embodiments of the disclosed invention, a dichroic mirror or element 224 can pass (or direct) a first portion 330 of the second component 328 of the received signal light 320 to the two-dimensional FPA 216, and can direct (or reflect) a second component of the second portion of the received signal light 328 to a star tracker FPA 220. (See also FIG. 2.)

With reference with FIGS. 3A and/or 3B, the transmit optics 112 can include beam shaping optical elements 332. In addition, the transmit optics 112 can optionally include beam steering elements 336. If provided, the beam steering elements 336 can selectively produce finite deflections from 0° to some non-zero angle. The beam steering element 336 can comprise a diffraction grating, an electro-optic beam deflector, a liquid crystal beam deflector, a steerable mirror, or an acousto-optic modulator crystal to steer the beam transmitted by the transmit optics 112. For example, steering of the transmitted beam can be used to avoid clouds, certain targets, to maximize time on target, etc. The beam steering element 336 allows selected targets or areas to be illuminated. In addition, the power of the signal produced by the light source 228 can be concentrated so that measurements can be made through clouds or heavy aerosol layers, and the concentrated beam can be steered so that selected targets or areas can be illuminated.

The illuminator or light source 228 may comprise a laser or light emitting diode (LED). For example, the light source 228 is generally configured to meet the radiometry and pulse width requirements of the LADAR function of the LADAR system 100.

The shared electronics 232 can comprise a number of components and/or subsystems. In accordance with embodiments of the present invention, the shared electronics are implemented by a number of field programmable gate arrays (FPGAs). For example, an inertial measurement unit (IMU) and a global positioning system (GPS) unit may be provided separately, or as a combined system or device 340. Thermoelectric coolers (TEC) controlled by the shared electronics 232 through suitable TEC drivers can be included to stabilize temperature within the enclosure 104. The IMU, GPS, and TEC device or board 340 may also be associated with a power supply, control electronics and can interface to other components in the shared electronics 232. As can be appreciated by one of skill in the art, the IMU and GPS functions can supply geo-location information that can be implemented by a variety of combined or integrated devices or boards, that specifically determines position of the system and receiver field of view orientation for each frame so that the acquired images can be mapped into a common data volume. For instance, the IMU and GPS functions can be provided by a board that utilizes micro electromechanical system (MEMS) technology for favorable size, weight and power (SWAP) characteristics. Alternatively, independent devices can be utilized if rigidly mounted to a common structure supporting the optical components to maintain precision alignment with the transmitter and receiver lines of sight. In particular instances, independent devices may be able to provide improved accuracy as compared to combined devices. Range process (XYZ) and data fusion electronics 344 can comprise a processor, for example provided as part of a processor board. The range process and data fusion electronics can combine signals from all of the LADAR system 100 sensors, including the LADAR FPA 212 and the two-dimensional FPA 216. In addition, the range process and data fusion electronics 344 can receive signals from the IMU/GPS electronics 340. As can be appreciated by one of skill in the art, the IMU/GPS electronics 340 can comprise or be associated with gyroscopic sensors, solid state rate sensors, accelerometers, and GPS receivers. The data from the combined signals from the data fusion processor 344 can comprise the final data stream 348. The final data product stream 348 can comprise independent, ortho-rectified, time tagged, video streams with IMU/GPS and image quality factor data in a frame header block. The end result per frame is a point cloud block with X, Y, Z data, and intensity (I) block that are all referenced to the frame editor with IMU/GPS and quality factor data.

The shared electronics 232 can also include focal plane array (FPA) control and interface electronics 352. The focal plane array control and interface electronics 352 can control the operation of the LADAR FPA 212 and the two-dimensional camera FPA 216, and/or the star tracker FPA 220. In addition, data from the FPAs 212, 216 and/or 220 can be received by the FPA control and interface electronics 352 for initial processing. Data from the FPA control and interface electronics may be passed to the range process and data fusion electronics 344 to be combined with data from other sensors in the LADAR system 100, and for other processing.

Such other processing can include image process (I), noise filter, ortho-rectification, and quality (Q) electronics 356. The signal processing electronics 356 can act on data provided by the sensors of the LADAR system 100, with or without prior processing. Moreover, the processing electronics 356 can operate on singular or combined data.

The light source 228 can be associated with laser power and control interface electronics 360. The laser power and control interface electronics 360 generally operate to control the timing and pulse width of signals provided by the light source 228.

Aperture control, optical zoom control, and beam deflection control electronics 364 can operate to control aspects of the receive aperture 108 and/or the transmit optics 112. For instance, with respect to the receive aperture 108, the aperture 316 can be controlled in response to the depth of field requirements of a focal plane array 212 or 216 in a particular situation, and/or to control the intensity of light received at the focal plane arrays 212 and 216. As a further example, the aperture control and beam deflection control electronics 364 can operate to control the beam deflector 336, to point the transmitted signal from the light source 228 at a selected target and/or to avoid obstructions.

Figure 4:
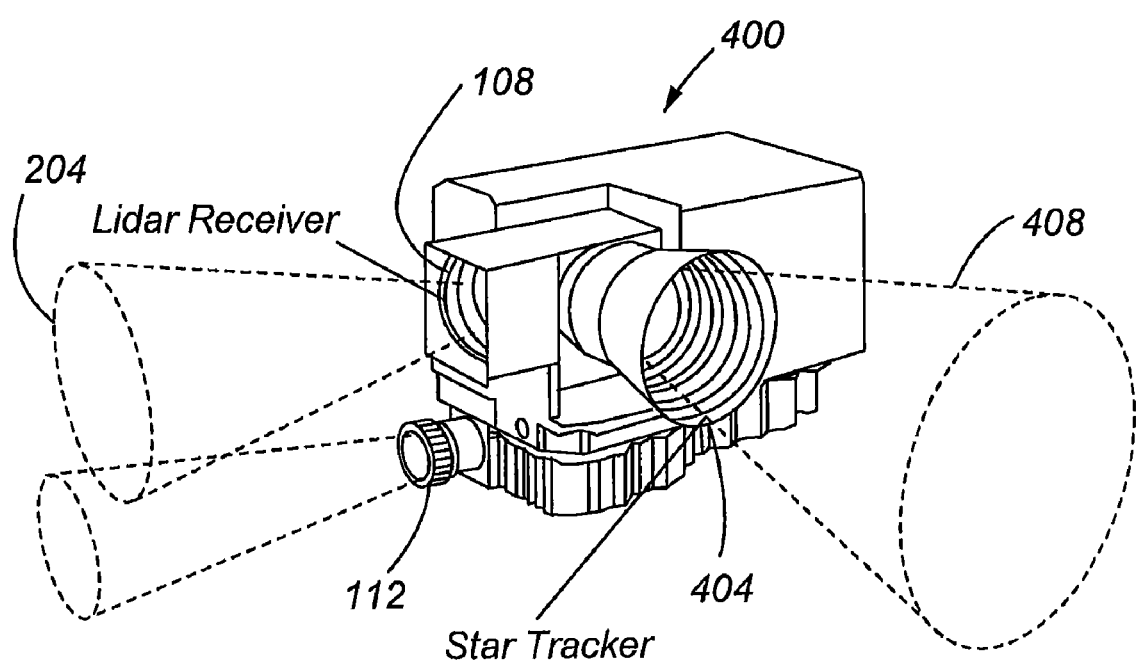
FIG. 4 depicts a flash LADAR system in accordance with other embodiments of the present invention.

FIG. 4 depicts a LADAR system 100 in accordance with other embodiments of the present invention. In general, this alternate LADAR system 100 features a shared enclosure or frame 104 that carries or encloses a shared receive aperture 108, and that additionally carries or encloses a star tracker optic 404 having a field of view 408 that is different than the field of view 204 of the receive aperture 108. For example, in accordance with embodiments of the disclosed invention, the field of view 408 of the star tracker optic 404 may be orthogonal to the field of view 204 of the receive aperture 108. A transmit optic 112 is also provided.

Figure 5A:
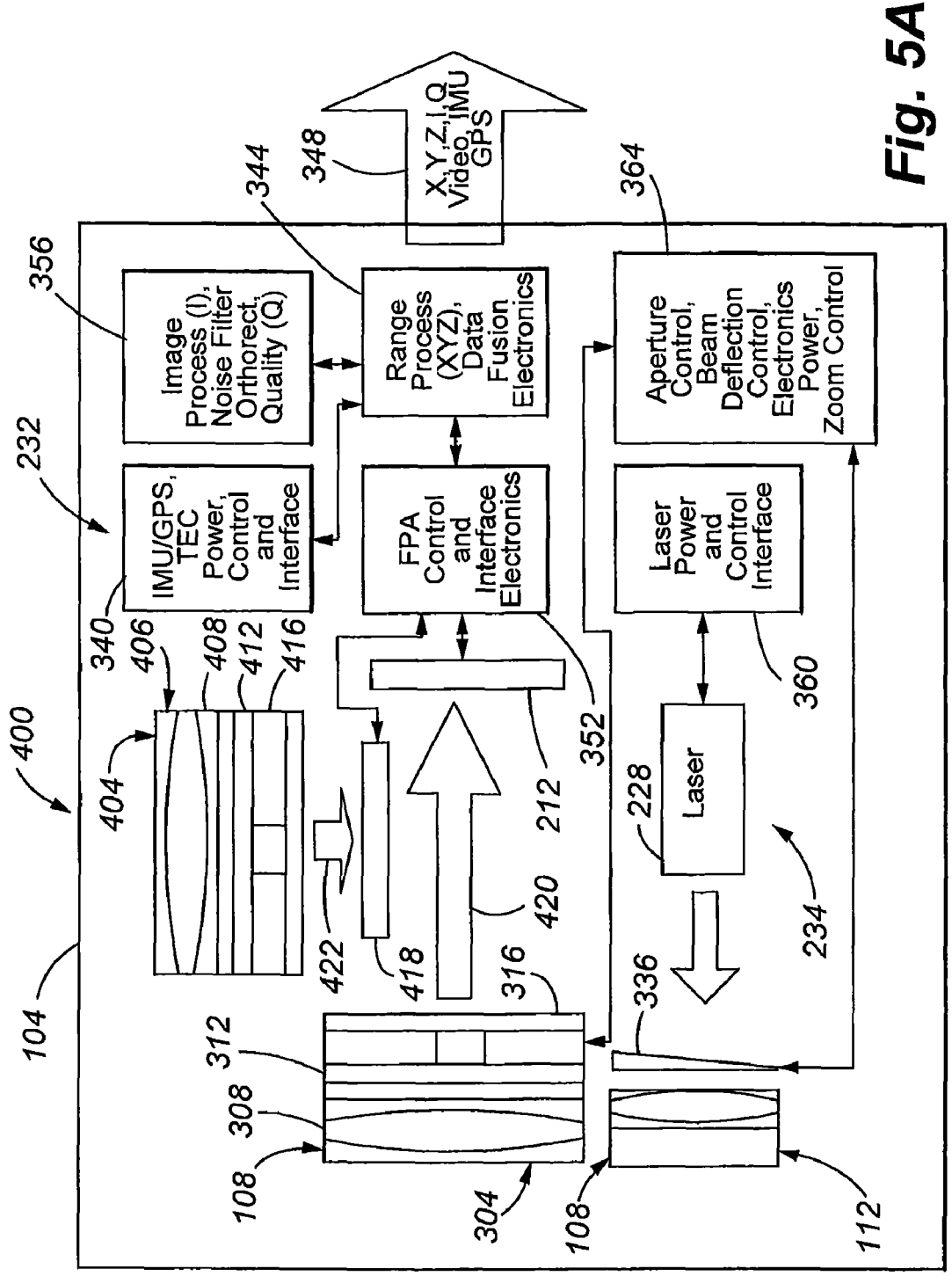
FIG. 5A depicts components of a flash LADAR system in accordance with other embodiments of the present invention.
Figure 5B:
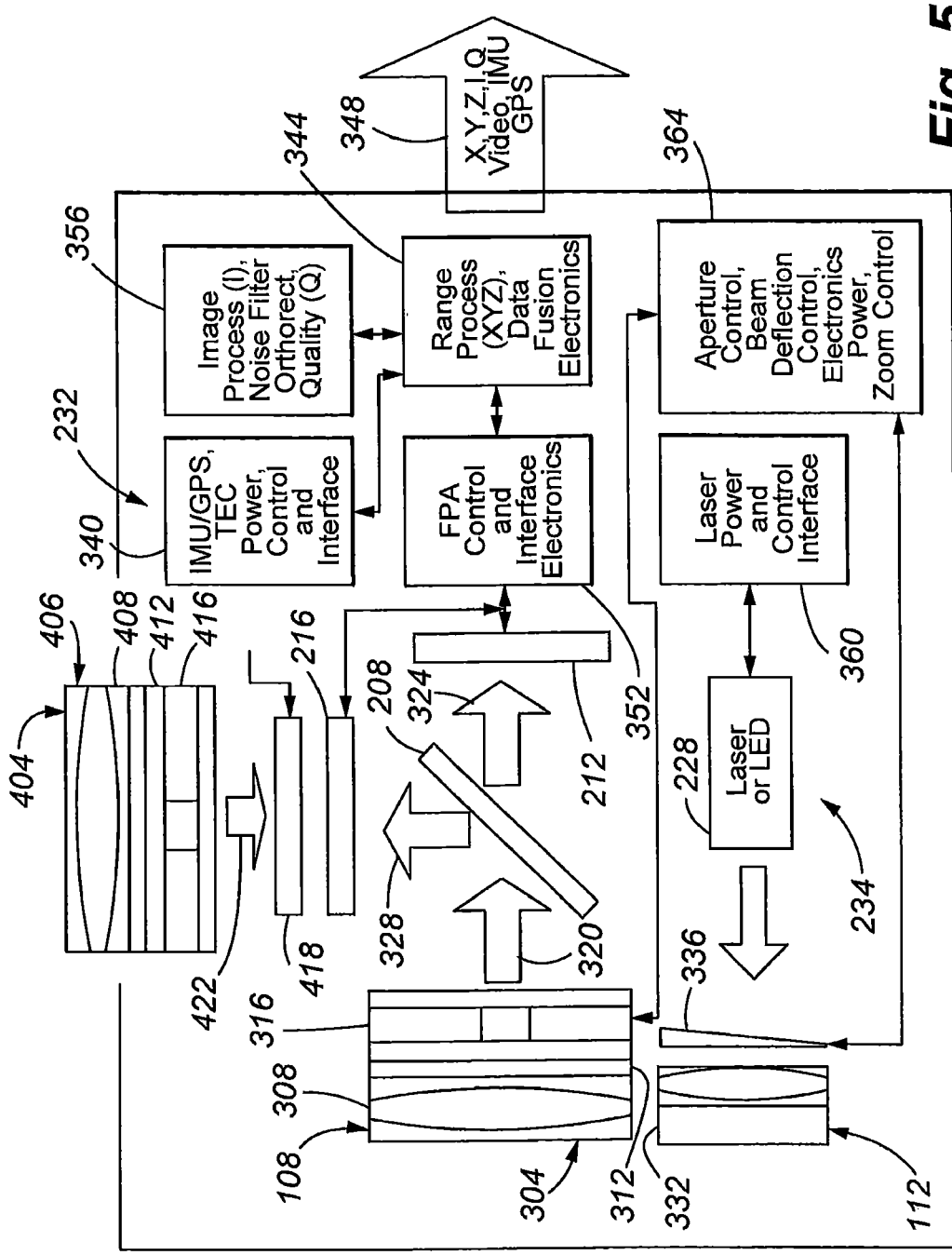
FIG. 5B depicts components of a flash LADAR system in accordance with other embodiments of the present invention.

FIGS. 5A and 5B are block diagrams depicting components of a LADAR system 100, such as is illustrated in FIG. 4. As shown, the various components are housed within or associated with the common enclosure or frame 104.

The shared receive aperture 108 generally comprises receive optics 304 that can comprise refractive and/or reflective optics 308. The shared receive optics 308 can be implemented as a telescope or camera lens with or without zoom capability as dictated by the specific application. In addition, the receive optics can include filters 312, such as background rejection filters. Aperture control and/or intensity control elements 316 can also be included.

The LADAR system 100 in FIGS. 5A and 5B include a star tracker aperture 404. The star tracker aperture 404 generally comprises star tracker optics 406 that can include refractive and/or reflective optics 408. The star tracker optics 406 can also include filters 412. The star tracker optics 406 can additionally incorporate aperture control and/or intensity control elements 416. Signal light 422 collected by the star tracker aperture 404 is received at a two-dimensional star tracker FPA 418.

Figure 5C:
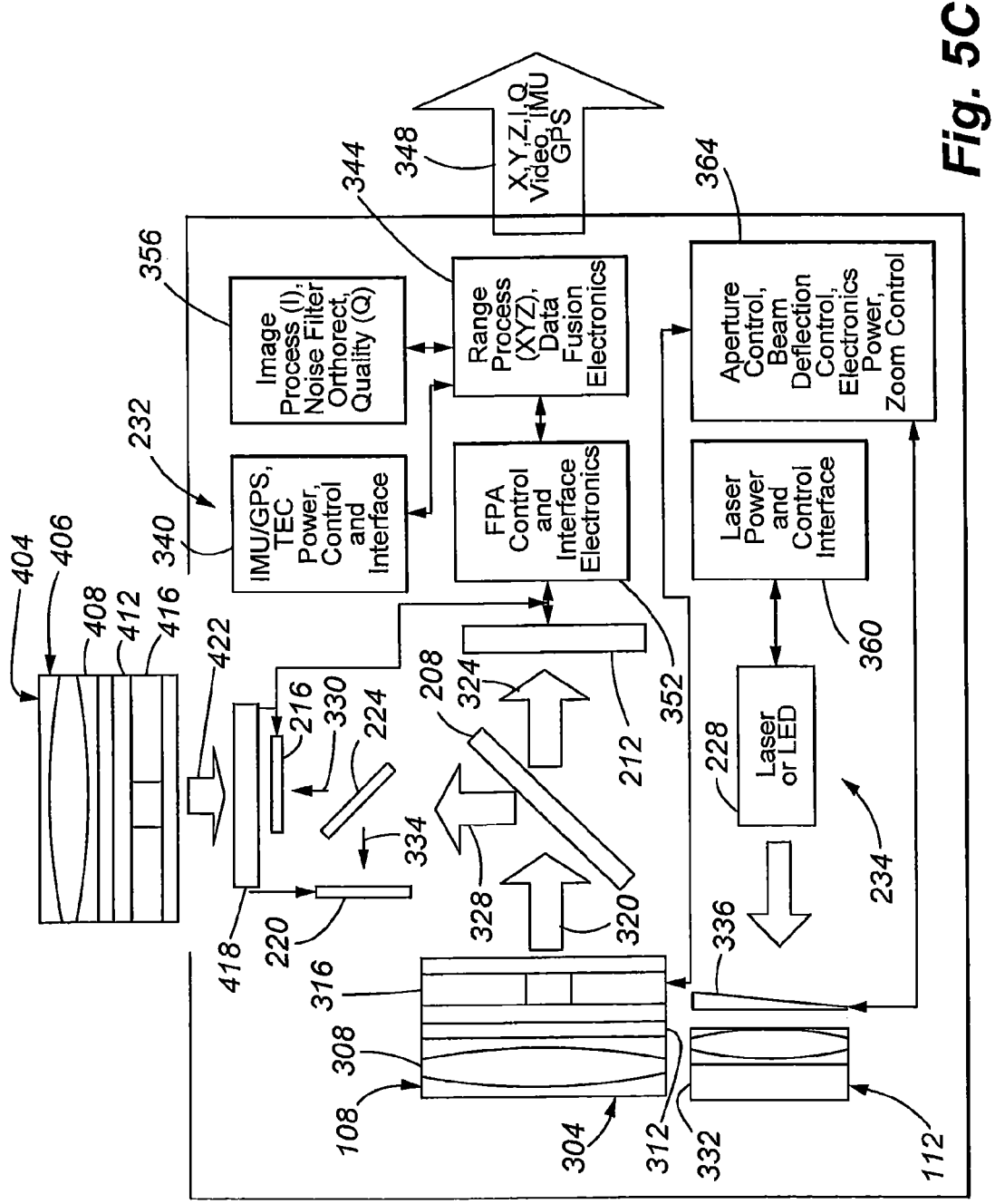
FIG. 5C depicts components of a flash LADAR system in accordance with other embodiments of the present invention.

Signal light 420 collected by the receive optics 304 in the LADAR system 100 is passed to the three-dimensional FPA 212. As shown in FIG. 5A, the signal light 420 collected by the shared receive optics can be passed to the three-dimensional array 212 directly. FIG. 5B illustrates an embodiment in which the LADAR system 100 includes a three-dimensional FPA 212, a two-dimensional FPA 216, and a star tracker FPA 418. As shown in FIG. 5C, a LADAR system 100 with a star tracker can include multiple star tracker FPAs 220 and 418, in addition to a two-dimensional FPA 216 and a three-dimensional FPA 212. For example, a first star tracker FPA 220 may receive a first portion of the light collected by the common receive aperture 108, while a second star tracker FPA 418 may receive light collected by the star tracker aperture 404.

The transmit optics 108 of the LADAR system 100 can be similar to the transmit optics 108 of other embodiments. Similarly, the shared electronics 232 of the LADAR system 100 can be like those of the LADAR system 100. Of course, various modifications can be made to reflect the different componentry and functions of different systems. For example, different focal plane array control electronics can be provided for control of and interface with the star tracker FPA 418 as compared to where a conventional two-dimensional FPA (e.g., focal plane array 216) are provided. As a further example, the aperture control electronics 364 can also control the aperture 416 of the star tracker optics 406. In addition, the range process and data fusion electronics can include facilities for processing and using data collected by the star tracker optics 406 and star tracker FPA 418 and/or collected by the common aperture 108 and the star tracker FPA 220, alone or in combination with data collected by the common aperture 108 and the two-dimensional FPA 216 and/or the three-dimensional FPA 212.

As can be appreciated by one of skill in the art, data from the star tracker optics 406 and the star tracker FPA 418 and/or the common aperture 108 and the star tracker FPA 418 can be used to augment or in place of data from an inertial measurement unit or global positioning system electronics 340. Accordingly, in accordance with at least some embodiments of the disclosed invention, a LADAR system 100 with a star tracker can provide the star tracker 220 and/or 418 in place of the inertial measurement unit and global positioning system electronics 340.

Flash LADAR systems 100 in accordance with embodiments of the present invention can provide a cost effective common sensor solution for GNC, HDA sensing, TRN, Altimetry, and Velocimetry. The system 100 integrates in one compact package a flash LADAR comprising a three-dimensional FPA 212 and optionally a high resolution low light imaging (LLI) or other two-dimensional FPA 216 with a highly capable signal processing system provided by shared electronics 232. The LLI can be capable of producing 1024× 1024 pixel images at a 10 Hz frame rate using only starlight illumination. This capability extends TRN, crude altimetry, and velocimetry using natural light image feature recognition to the night side of the moon, and to deep shadow regions beneath crater rims and near the lunar poles. Using natural light feature recognition extends the potential TRN operational range to include orbit, de-orbit burn, transfer orbit, and powered descent phases. Below 100 km altitude, the addition of LADAR altimeter data improves the LLI feature correlation algorithm accuracy and significantly reduces the algorithm convergence time. During powered descent, feature correlation TRN can also be achieved using the LADAR images, and the LLI can be used for HDA (to a limited extent) providing redundant capabilities for precision, low risk landing. Since the imager and LADAR share a common aperture and signal processing system, only a single mechanical, electrical, and data interface is required between the lander and the sensor. Thus, the LLI provides a significant extension to the LADAR capabilities, tightly coupling the LADAR and LLI processing provides precision and processing efficiency synergies, the lander interface is significantly simplified, cost and weight savings are realized, and they each provide a measure of redundancy for the other.

Figure 6:
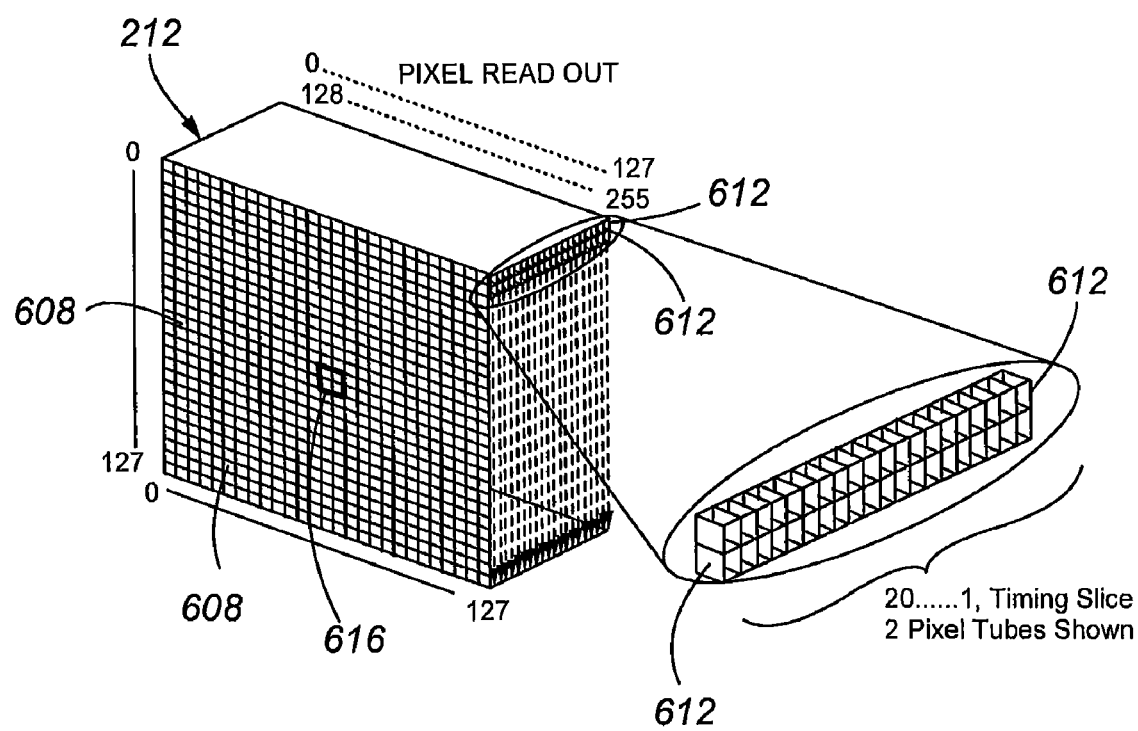
FIG. 6 is a depiction of a flash LADAR detector array in accordance with embodiments of the present invention.

FIG. 6 illustrates a three-dimensional detector array 212 of a flash LADAR system 100 in accordance with embodiments of the present invention. The three-dimensional detector array 212 comprises a plurality of pixels 608. FIG. 6 also depicts the acquisition of time of flight information in the form of tubes 612 extending behind the face of the array. In particular, as can be appreciated by one of skill in the art, intensity information received at each pixel 608 is recorded at a plurality of time slices, in order to identify for each pixel when a maximum intensity signal is received. In general, each pixel 608 can be expected to receive a waveform having an intensity that tracks the intensity of the pulse transmitted by the light source. The time that has elapsed since the laser reached its maximum intensity and the time at which that portion of the generated wave form was received at a detector pixel 608 is used to obtain range information. As can be appreciated by one of skill in the art, the system 100 implements a flash LADAR in that a signal (an image) can be collected by some or all of the pixels 608 simultaneously or as a point cloud over a discrete period of time. Moreover, the entire field of view 204 can be imaged by the three-dimensional FPA 212 with a single laser flash produced by the light source 228.

In order to support operations requiring an imaging LADAR, a plurality of pixels 608 are provided as part of the three-dimensional detector array 212. However, during operations in which only a small number of pixels 608 (e.g., less than four pixels, or even one pixel) are required, only a few of the pixels 608 may be used to obtain data. For example, pixels 608 included in the group 616 of four pixels 608 at a center of the array 212 may be active. The group of pixels 616 used in connection with such operations may be selected such that they correspond to an area of the detector array 212 at which a return from a narrow beam of light produced by the light source 228 is expected to be received.

Figure 7A:
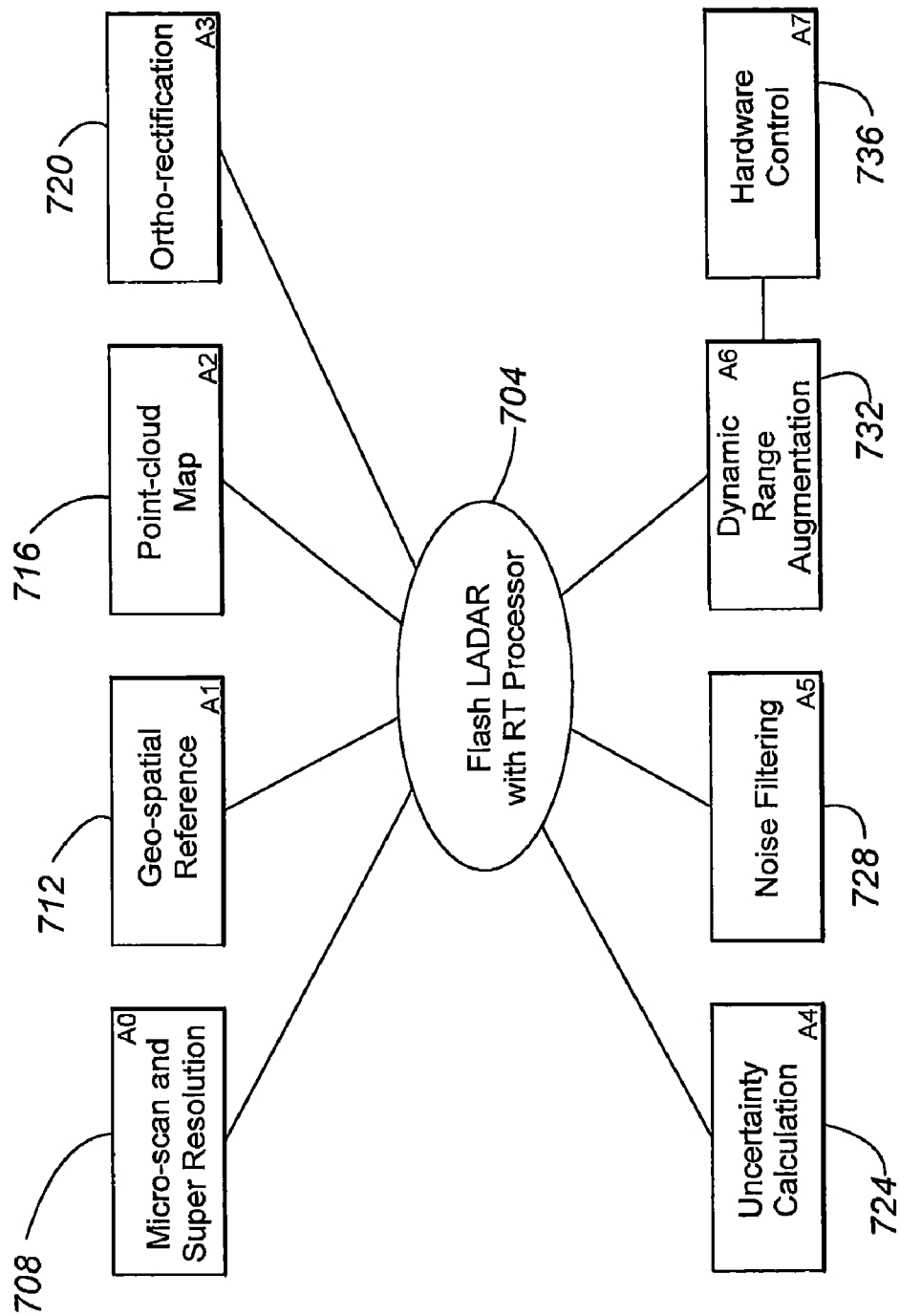
FIG. 7A depicts processes performed by a real time processor associated with a flash LADAR in accordance with embodiments of the present invention.

FIG. 7A depicts processes performed by a real time processor 704 associated with a flash LADAR system 100 in accordance with embodiments of the present invention. For example, the real time processor 704 may be provided by the shared electronics 232. The central process running on the real time processor 704 can be associated with a number of sub-routines or processes. These sub-routines or processes can be executed by the real time processor 704 in the same or different components or boards as the central processor other processes in the shared electronics package 232. For instance, a micro-scan and super resolution process 708 can be provided to obtain an increased effective resolution from the focal plane arrays 212, 216 and/or 418. A geo-spatial reference process 712 generally functions to correlate a location of the LADAR system 100 to an absolute position using inertial measurement unit and/or global positioning system data. Alternatively or in addition, the geo-spatial reference process 712 can perform terrain relative navigation, or use star tracker data, and/or GPS data. The point cloud map process 716 processes the data collected by the three-dimensional FPA 212 to provide three-dimensional image and range information. The ortho-rectification process 720 corrects data obtained by one or more of the focal plane arrays 212, 216, 418 for optical distortion. The uncertainty calculation process 724 determines the range of error or error bars that are appropriately associated with data obtained or used by the LADAR system 100. The noise filtering process 728 can be applied to remove noise or other extraneous data from signals. The dynamic range augmentation process 732 can function to adjust the gain of the receive aperture 108 and/or the star tracker aperture 404. The dynamic range augmentation process 732 can be associated with hardware control 736, for example where the aperture 316, 416 of a camera or telescope is controlled.

The real time processor 704 provides a processing system for 3D imaging LADAR systems 100 that allows for the processing of data in real time, and without requiring post processing. In one aspect, the real time processor 704 processes the tubes of information 612 collected by the pixels 608 of the three-dimensional detector array 212. In particular, the data is buffered so that curve fitting can be performed on multiple pixel tubes 612 in parallel using curve fitting algorithms implemented by the real time processor 704. For example, the real time processor 704 can comprise a field programmable gate array (FPGA) and the curve fitting is performed using algorithms implemented in the FPGA's firmware. More particularly, the FPGA code can implement a parallel processor type arrangement in which multiple instances of the curve fitting algorithm each process a pixel tube 612 simultaneously. In accordance with embodiments of the present invention, the curve fitting algorithms implement a parabolic curve fitting.

In addition, data collected by the LADAR system 100 is passed through a noise filtering process 728 to subtract systematic spatial and temporal noise. In addition, correction for non-ideal aspects of the LADAR system 100 components can be performed. For example, non-ideal characteristics such as non-uniform response from pixel to pixel 608 (background subtract), saturated pixels 608 then influence adjacent pixels 608 (global crosstalk), non-uniform dark currents and other characteristics and noise are subtracted out prior to curve fitting and range calculation.

The curve fitting that is performed is, in accordance with embodiments of the present invention, curve fitting of the digitized waveform. The result is improved range estimates. This is because the curve fitting of the digitized waveform allows the waveform maximum to be calculated to a high degree of precision. The orthorectification process 720 is performed in real time to correct for the distortion induced by the receive aperture 108. In order to perform the orthorectification process 720, the distortion inherent to the receive optics 308 is measured as part of a calibration step. The correction required to compensate for this distortion is then encoded in a suitable form to allow each three-dimensional frame of data collected by the three-dimensional FPA 212 to be corrected following the range calculation. During the orthorectification process 720, data products, including the X, Y, Z data for each point in a cloud of points that make up a scene frame of three-dimensional information collected by the three-dimensional FPA 212, the total intensity (I) per pixel, and the quality factor (Q) of the fitted curve to the raw data are produced. If data is available from inertial measurement units and/or the global positioning system 340, the location data from the IMU or GPS can be incorporated into frame header blocks that can be accessed by software or firmware that operates to assign absolute GPS and IMU values to every point in the cloud of positive position data. High level averaging filters can also be implemented to operate on the data stream and to prepare it for use by feature based algorithms implemented as soft core virtual central processing unit (CPU) elements of the real time processor 704.

In accordance with embodiments of the present invention, real time access to IMU and/or GPS data is available. This allows algorithms running on the real time processor 704 to perform cross calibration of IMU/GPS data to that of identifiable features identified through frame to frame correlations of collected data. As a result, IMU drift can be corrected, for example when GPS information is not available, by using identifiable three-dimensional features that appear in the real time point cloud data collected by the three-dimensional FPA 212. These features can be identified by the high level filter algorithms running in the virtual CPUs on the real time processor 704. Accurate geo-location information can therefore be made available, even where GPS information is unavailable. In operation, identifiable three-dimensional features can comprise previously mapped target features that are used as keys to allow for more accurate three-dimensional frame to frame registration of point clouds through "stitching", where common features in each frame are overlaid with the help of iterative algorithms running as high level filters in soft core CPUs on the real time processor 704. By cross calibrating geo-location data with the point cloud data, each three-dimensional frame of data is referenced to a point in absolute coordinate space. Accordingly, it is imperative that the orthorectification algorithm 720 operate with sufficient accuracy. In order to provide such accuracy, the receive optics 308 are calibrated directly to provide an orthorectification matrix. The matrix can be implemented as a lookup table in non-volatile random access memory (NVRAM). This allows the orthorectification algorithms 720 to be independent of the specific characteristics of the receive optics 308.

The microscan and super resolution process 708 or over-sampling process improves the resolution of the three-dimensional seam data collected by the three-dimensional FPA 212 through time averaging. In particular, all mobile sensor platforms vibrate or jitter. Normally this is associated with image degradation. However, with a flash LADAR system 100, the jitter inherent to a mobile sensor platform can be used to provide a form of low level scanning. As a result of this scanning, data collected in a sequence of frames can be interpolated to obtain higher resolution results. This is possible because the illumination flash provided by the light source 228 is so brief than any ordinary motion of the platform is frozen in time. Consequently, platform motion does not degrade the image, but rather acts to sample a larger field of view. When multiple images of adjacent field of views are interpolated, the higher resolution image results. In addition to significantly improved three-dimensional resolution, this technique can also result in lowered noise levels. That is, the signal to noise ratio improves with the square root of the number of frames averaged.

Terrain relative navigation is typically achieved using an altimeter that constantly samples the height of the terrain directly below the platform moving along a velocity track. The one-dimensional topography information thus obtained is compared to a topographical database, that allows a current bearing and location of the platform to be obtained. In accordance with embodiments of the present invention, three-dimensional images or footprints are obtained by the three-dimensional FPA 212 along the velocity track of the LADAR system 100 platform. This periodic sampling of two-dimensional topography as opposed to one-dimensional altitude values, provides more information in each image frame that can be compared to an internal topographic database, as compared to a one-dimensional track. This simplifies the task of determining the bearing and position of the platform, and in turn results in lower computational time and power requirements for the real time processor 704, as opposed to processes that use a series of one-dimensional altitude values.

Hazard detection and avoidance (HDA) can be implemented as one or more algorithms running on the real time processor 704. The HDA algorithm functions to identify hazards in the flight path or landing zone with enough time margin to allow avoidance. The flash LADAR system 100 in accordance with embodiments of the disclosed invention provide a nearly instantaneous illumination flash from the light source 228, and the rapid availability of three-dimensional image data avoids the time correlation limitations inherent to scanned LADAR systems. Moreover, as noted above, the jitter of the platform can be used to obtain enhanced image resolution. As a result, hazard detection avoidance performance is improved as compared to scanned LADAR.

In accordance with embodiments of the disclosed invention, imaging velocimetry is performed. Imaging velocimetry refers to measurement of the platform velocity vector with respect to the ground using successive camera images and knowledge of ground features to determine bearing and position. The flash LADAR system 100 allows surfaces to be correlated between frames of data, rather than projections of surfaces. Accordingly, range and scaling errors are avoided, allowing for higher precision. The imaging velocimetry function can be performed as an algorithm running on the real time processor 704.

In accordance with embodiments of the disclosed invention, the co-aligned three-dimensional FPA 212 and two-dimensional FPA 216 image data allows the three-dimensional feature information to provide type points that can be used for each high resolution two-dimensional image data frame. As a result, the high resolution two-dimensional data collected by the two-dimensional FPA 216 data can be accurately registered. In particular, actual features in the correlated three-dimensional imagery obtained by the three-dimensional FPA 212, which is essentially immune to platform jitter, can be used to accurately locate and register frames of two-dimensional data taken at different times by the two-dimensional FPA 216. Moreover, the correlation between two-dimensional and three-dimensional data allows the location of hidden or buried features, such as land mines, to be detected and located accurately. This high resolution two-dimensional image registration using three-dimensional information feature can be implemented by an algorithm running on the real time processor 704.

In addition, high resolution two-dimensional image scaling from three-dimensional information can be performed. In particular, the provision of three-dimensional 212 and two-dimensional 216 sensors that are co-aligned and that share a common aperture 108 and receive optics 308 allows real time, co-aligned three-dimensional feature information to provide altimetry data for each high resolution two-dimensional frame in real time. That is, from the altitude information, accurate scaling or sizing of high resolution two-dimensional normal and stereographic imagery can be performed. Moreover, this feature can be performed even in the presence of platform jitter. The feature of high resolution two-dimensional image scaling from three-dimensional information provided by LADAR systems 100 in accordance with embodiments of the present invention can be implemented by an algorithm running on the real time processor 704. In accordance with still other embodiments of the disclosed invention, high speed two-dimensional image correlators can be combined with real time three-dimensional processors. The two-dimensional correlators provide high resolution feature recognition and tracking of known objects. This information can be cross-correlated in real time to improve simultaneous three-dimensional point cloud geo-location when that is the desired final data product. For example, where two-dimensional video trackers have identified a potential target, the high resolution three-dimensional information taken simultaneously with the two-dimensional information can be used for targeting purposes. The provision of three-dimensional image enhancement from two-dimensional information can be performed by an algorithm running on the real time processor 704.

The real time processor 704 can also perform dynamic range augmentation, for example through the execution of an algorithm. In particular, the dynamic range augmentation algorithm can adjust sensor gain and aperture zoom to maximize the quality of the range data while minimizing intensity saturation and cross talk effects.

Figure 7B:
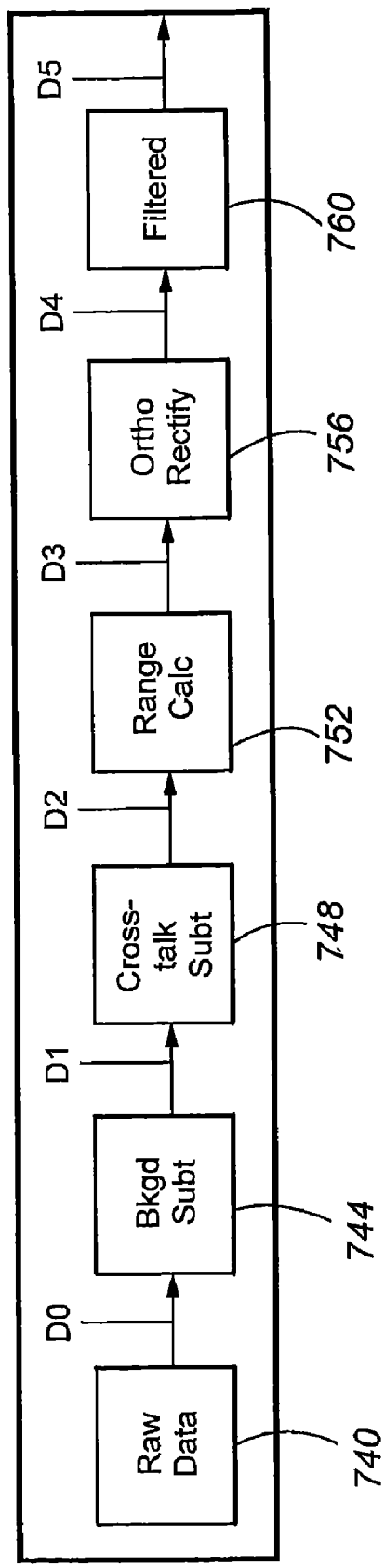
FIG. 7B depicts the processing of flash LADAR data in accordance with embodiments of the present invention.

FIG. 7B illustrates the levels and sequence of real time processor 704 processing steps in accordance with an exemplary embodiment of the present invention. More particularly, a sequence of algorithms and the data products produced are illustrated. Initially, raw data 740 is collected. This raw data can comprise multiple time slices or frames of data collected by the three-dimensional FPA 212. The raw data (D0) is then passed to a background subtraction algorithm 744. The background subtraction algorithm includes adjusting the data for the non-uniform characteristics of pixels 608 included in the three-dimensional FPA 212. The data after background subtraction (D1) is then processed using a cross talk subtraction algorithm 748. The cross talk subtraction algorithm 748 adjusts for the effects of saturated pixels on neighbor pixels. The cross talk subtracted data (D2) is then passed to a range calculation algorithm 752. The range calculation algorithm 752 calculates a range from the LADAR system 100 to the target for each pixel 608 in the three-dimensional FPA 212. After the range calculation has been performed, the resulting data (D3) includes time (T), intensity (I) and quality (Q) information. Moreover, by performing curve fit processing, the intensity can be calculated with great accuracy. After range calculation, the data D3 is passed to an orthorectification algorithm 756. The orthorectification algorithm is performed in real time and corrects for the distortion induced by the receive optics 308. Accordingly, after orthorectification, the resulting data D4 provides orthorectified X, Y and Z information. That is, an accurate topographic image is contained in the data. The orthorectified data D4 can then be processed by higher order filter algorithms 760, including spatial filtering. The resulting data D5 does not require any post processing in order for beneficial use to made of the three-dimensional point cloud data collected by the three-dimensional FPA 212. In addition, the data D5 is available in real time (i.e., at or before the time at which a next frame of raw data D0 is available from the three-dimensional FPA 212). Moreover, the process data D5 is available at high frame rates (i.e., greater than 30 frames per second).

Figure 8:
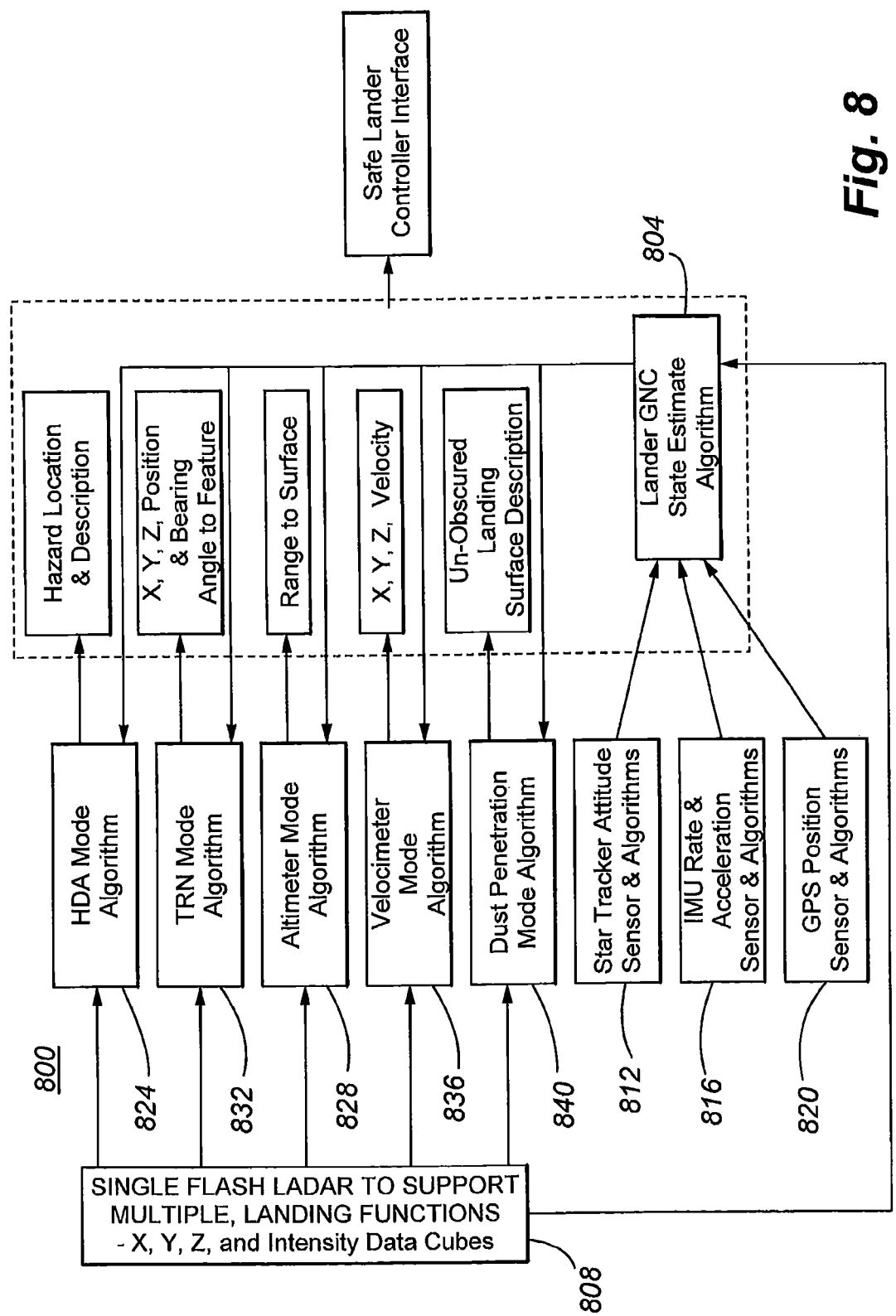
FIG. 8 is a block diagram depicting a critical algorithm suite operating in multiple modes of a LADAR system in accordance with embodiments of the present invention.

FIG. 8 is a block diagram depiction of a critical algorithm suite operating in multiple modes, in real-time, and in a progressing manner to enable all the essential planetary landing functions such as GNC, Altimetry, Velocimetry, TRN, HDA, and dust penetration to be accomplished in a single unit in accordance with embodiments of the present invention.

The guidance, navigation and control (GNC) 804 portion of the algorithm suite in the navigation mode determines the lander's current dynamical state by using the LADAR detailed range images 808, obtained by the three-dimensional FPA 212 in combination with the light source 228, of the potential landing site, star-tracker attitude information, and the IMU/GPS rate, position, and acceleration information 816 and 820 to generate estimates of attitude, rate, position, and velocity of the lander (i.e., the lander's dynamical state). The LADAR determined range images 808 can be combined with the processed three-dimensional data (D5). In the guidance mode, the algorithm suite 800 determines the lander's required dynamical state for safety and computes the landing reference altitude and trajectory profiles for safe landing. Finally, in the control mode, the algorithm executes the control actions necessary for safe landing.

In the HDA mode, the HDA portion 824 of the algorithm suite 800 commences operations close to the landing site (e.g., below 4 km). Here, the algorithms use the flash LADAR data 808 combined with GNC information to generate detailed digital elevation maps of the landing surfaces including identifying obstacles to safe landing. The generated elevation ranges can be compared to a database of known features to derive safe navigation maps, for example for aircraft or spacecraft landing.

In the altimetry mode, the altimetry portion 828 of the algorithm suite 800 operates between the transfer orbit phase and the beginning of pitch over roll maneuver. For example, when a LADAR and imager scanning mirror is flipped out of the optical path, allowing the sensor to look down on the terrain. During this phase of the descent, the LADAR beam divergence can be restricted by the transmit optics 112 to illuminate a field of view corresponding to a small number of pixels of the three-dimensional detector array 212, such as a 2×2 pixel field of view, and the LADAR operates in altimeter mode. As the pitch over roll maneuver begins, the LADAR beam will pitch aft. During these relatively rapid maneuvers, attitude information from the IMU and star trackers will be used to determine the pitch angle and correct the line of sight (LOS) range information to the equivalent altitude by geometry. When the pitch angle exceeds 45 degrees, the scanner will be flipped in to its final descent position, transiting the altimeter beam to 45 degrees forward pitch. There will be a brief gap in altimetry data during the scanner flip. Geometric altimeter correction will be carried out using the IMU. At 2.5 km altitude, the LADAR will be switched to full imaging mode for HDA operations. In this mode, altimetry is still readily available from the range information from the central pixels. Note that if the HDA ground footprint is restricted to the Illuminated Field of Regard (IFOR) of the LADAR, then the scanner can be eliminated and the switch from altimeter to imaging modes can be accomplished more simply by rotating the entire LADAR and imager sensor by 90 degrees. Provided a priori images of the approach and descent path are available (from Lunar Reconnaissance Orbiter, for example) it is also possible to derive altitude from feature correlation with the LLI images.

In the TRN mode, the TRN portion 832 of the algorithm suite 800 uses terrain elevation maps, if they are available, and correlates them in real-time with the LADAR altimeter and GNC information to estimate a safe landing location by the terrain contour matching (TERCOM) method, commonly used for navigation by cruise missiles. In particular, a time history of line of sight range information is used to develop high precision surface contour maps for comparison to pre-existing contour maps to determine absolute location, direction and speed. This can also be done using two-dimensional contour maps and implementing two-dimensional correlations. In addition, this can be done using self-acquired images and sequential correlations to determine relative navigation information. The algorithms also provide commands back to the LADAR to reduce the FOV and use a few of the LADAR focal plane array pixels to extend the range of TRN. If images of the terrain beneath the flight path are available, then features (crater, large boulders, etc) extracted from the LLI images can be correlated with the prior data to determine current location. During the terminal descent phase, features identified in LADAR and LLI maps made earlier in the descent can be correlated real time with features in current images to provide high precision TRN right up to touch-down. Flash intensity image correlation and range image correlations can also be used jointly to reduce errors and resolve ambiguities in TRN.

In the velocimetry mode, the velocimetry portion 836 of the algorithm suite 800 uses vertical velocity data generated by the LADAR from the change in altitude over time plus information from the GNC to generate X, Y, Z, velocity components of the lander. Since the LADAR measurements can occur at 30 Hz, and can be accurate to 2 cm, descent velocity can be estimated to 2.8 cm/s in 1/15 seconds, or 1 cm/s over a one second average. The algorithms generate horizontal velocity estimates using spatial correlation of sequential images from the LLI and/or the LADAR. In the case of the LADAR, the range map provides high quality correlation features even when the intensity image contrast is low. Since the altitude is accurately measured, the feature offsets between images can be calibrated. In particular, line of sight velocities for the change in range between sequential images can be determined with high precision by averaging over many select pixels acquired simultaneously. Thus the ground offset difference between images (adjusted for the orbital altitude) divided by the frame time provides the X-Y ground speed.

In the dust penetration mode, the dust penetration portion 840 of the algorithm suite 800 uses the flash LADAR data combined with GNC information to generate un-obscured digital elevation maps of the landing surfaces including identifying obstacles to safe landing. This occurs primarily by a "see and remember" technique wherein the LADAR can build up full images through the shifting obscuration and transparency of dust clouds over time as can occur when descent braking jets are activated.

The combination of two-dimensional 216 and three-dimensional 212 focal plane arrays or sensors using a common aperture 108 provides various synergies. For example, high resolution two dimensional images cannot be scaled properly without accurate range data. The flash LADAR signal collected by the three-dimensional FPA 212 provides the range data necessary to accurately scale two-dimensional images collected by the two-dimensional FPA 216. In addition, the effective resolution of the three-dimensional FPA 212 can be improved through range scaled two-dimensional image feature recognition. The fusion of data from the two-dimensional FPA 216 and the three-dimensional FPA 212 also facilitates the accurate registration of adjacent image frames.

Figure 9A:
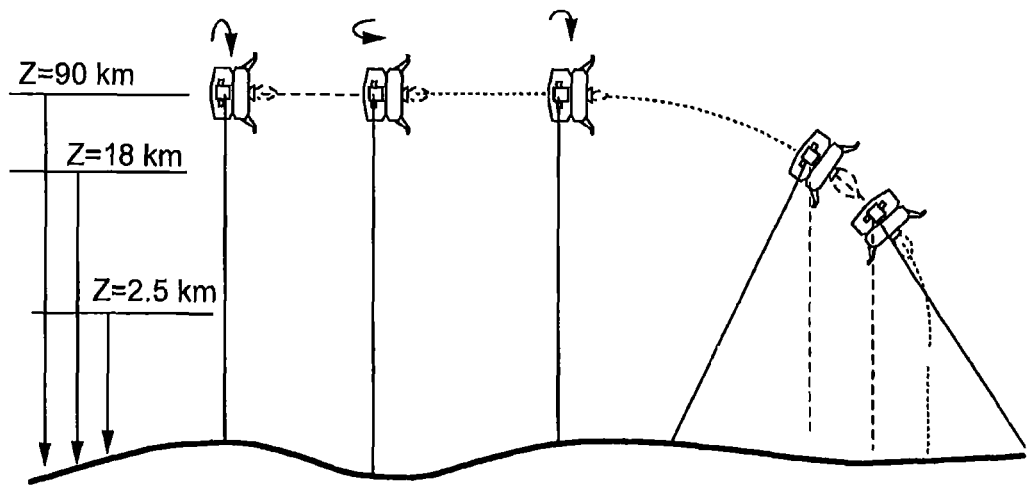
FIGS. 9A and 9B depict a landing scenario using LADAR in accordance with embodiments of the present invention.
Figure 9B:
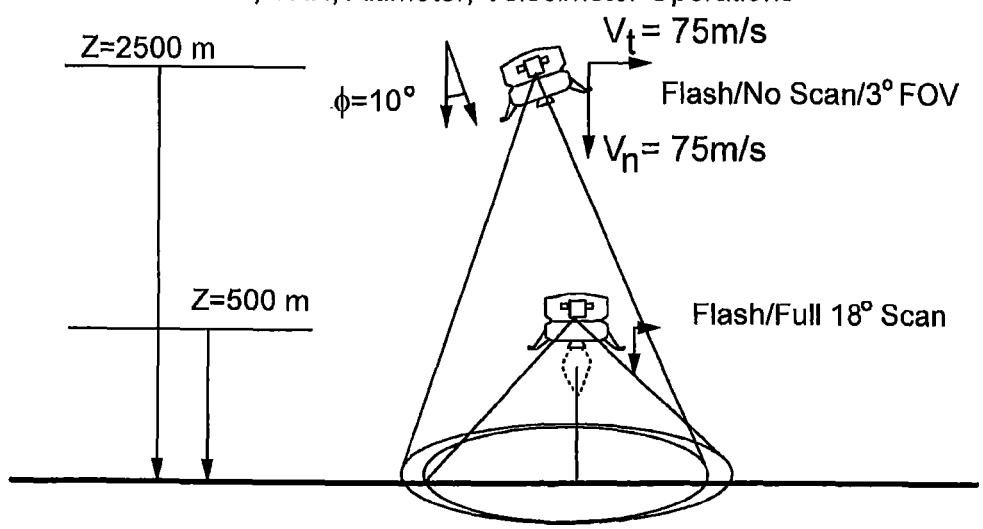

FIGS. 9A and 9B show the landing scenario in association with embodiments of the present invention. In particular, the transfer orbit to powered descent phase is shown in FIG. 9A, and the terminal descent phase is shown in FIG. 9B. The LADAR and LLI point downwards during the initial descent phases allowing use of the LADAR for altimetry and velocimetry, and both sensors for TRN depending on the available image and elevation map database. During Terminal Descent, the LADAR beam divergence is increased to illuminate the entire field of regard (FOR). The scanning mirror can also be flipped into place, and both the LADAR and imager can scan multiple FORs. HDA, TRN, Altimetry, and Velocimetry are simultaneously operable during this phase. It is assumed that mission-specific information has been previously uploaded to the sensor, such as: path terrain relief for terrain contour mapping TRN, images of the path to target for feature correlation TRN on which the target landing location is identified, and acceptable hazard thresholds (e.g. size and slope).

Figure 10B:
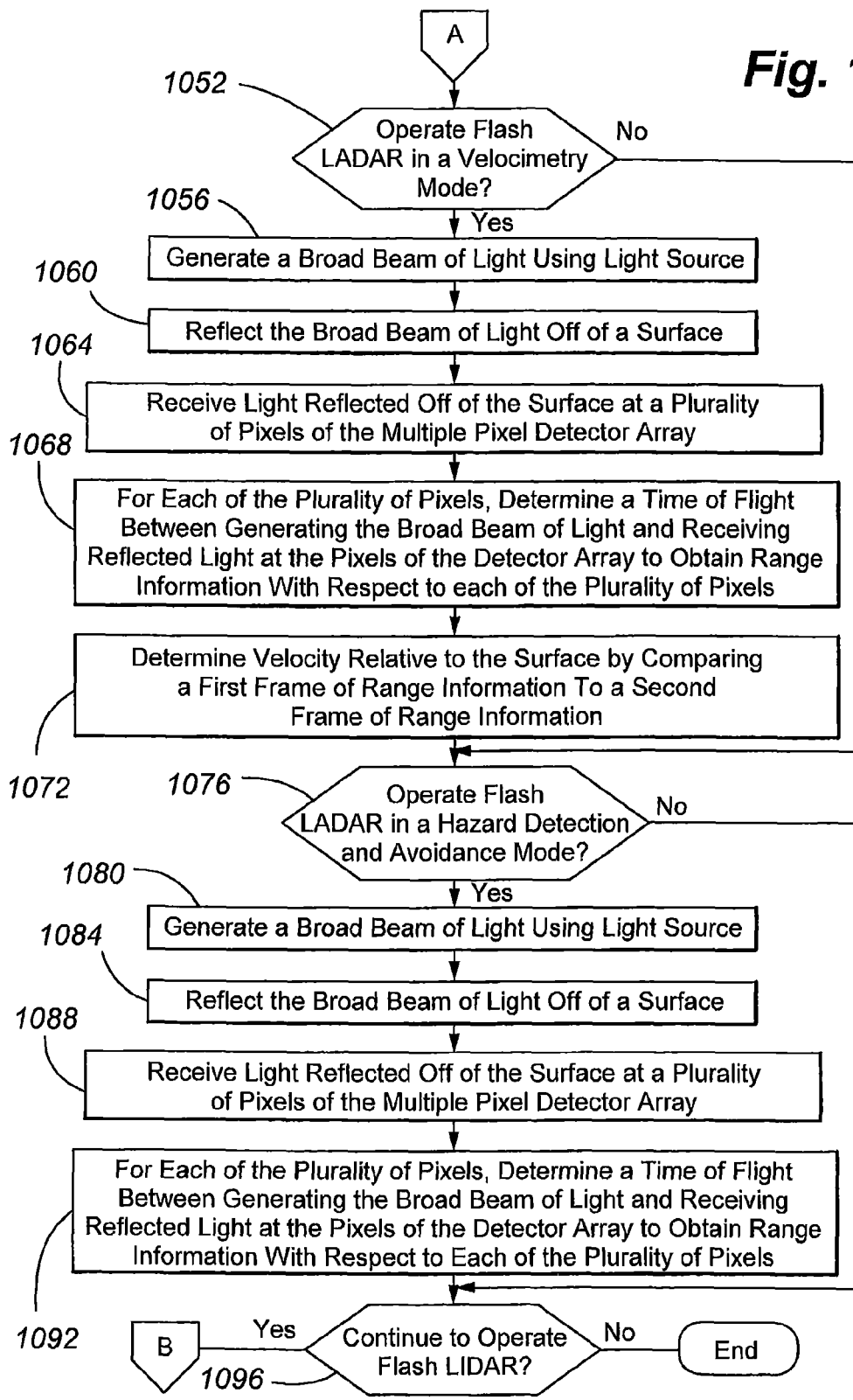

FIGS. 10A and 10B depict aspects of the operation of a flash LADAR 234 based system 100 in accordance with embodiments of the present invention. Initially, at step 1000, the system is started. At step 1004, a determination may be made as to whether the flash LADAR 234 should be operated in an altimeter mode. As previously discussed and as can be appreciated by one of skill in the art, the altimeter mode can be utilized at a relatively large range or altitude. If it is determined that the flash LADAR 234 should be operated in an altimeter mode, a narrow beam of light is generated using the light source (step 1008). The narrow beam of light is then reflected off of a surface, such as the surface of a body on which a vehicle associated with the flash LADAR 234 is to land (step 1012). The light reflected off of the surface is received at one or a few pixels 608 (e.g., 2-4 pixels) of the multiple pixel three-dimensional detector array 212 (step 1016). In particular, because a narrow beam of light is generated in the altimeter mode, reflected light can be expected to be concentrated at one or a few pixels 608 of the three-dimensional FPA 212, increasing the effective range of the system in the altimeter mode as compared to modes in which a broader beam is utilized. In accordance with embodiments of the present invention, the width of the beam of light transmitted by the system is variable, to provide illumination of different numbers of pixels for use at different ranges. Accordingly, in the altimeter mode, only light from a small number of pixels, such as a group 612 of pixels 608 at a location corresponding to the transmitted beam of light, need to be monitored for reflected light. At step 1020, a time of flight between generating the narrow beam of light and receiving reflected light at the pixel 608 or group of pixels 612 of the three-dimensional FPA 212 is monitored to obtain range information.

After obtaining range information, or after determining that the flash LADAR 234 should not be operated in an altimeter mode, a determination may be made as to whether the flash LADAR 234 should be operated in a terrain relative navigation (TRN) mode (step 1024). If it is determined that the flash LADAR 234 should be operated in a terrain relative navigation mode, a narrow beam of light is generated using the light source 228 (step 1028). The narrow beam of light is reflected off of a surface, such as the surface of a body on which a vehicle associated with the flash LADAR based system will land (step 1032). The light reflected off of the surface is received at a pixel or group of pixels 612 of the multiple pixel three-dimensional FPA 212 (step 1036). A time of flight between generating the narrow beam of light and receiving reflected light at the pixel or group of pixels 612 of the three-dimensional FPA 212 is then determined to obtain range information (step 1040). The collected range information is added to a range profile so that, over time, surface contour information is collected (step 1044). The location of the LADAR based system 100 relative to the surface is then determined by matching the obtained surface contour information to surface contour reference information (step 1048). As can be appreciated by one of skill in the art, the surface contour reference information may be stored in data storage accessible to or maintained as part of the flash LADAR 234 based system 100.

As can be appreciated by one of skill in the art the present invention enables simultaneous operations of the altimeter mode and terrain relative navigation mode. In particular, in the altimeter mode instantaneous range data is used to determine an altitude, while in the terrain relative navigation mode range information is collected over time and compared to previously collected surface contour data. Accordingly, a system in accordance with embodiments of the present invention can provide altitude information while at the same time determining a relative location of the flash LADAR based system using terrain relative navigation.

After determining location information using TRN techniques, or after determining that the flash LADAR 234 should not be operated in a terrain relative navigation mode, a determination may be made as to whether the flash LADAR 234 should be operated in a velocimetry mode (step 1052). In a velocimetry mode, a broad beam of light is generated using the light source 228 (step 1056). The broad beam of light is reflected off of a surface, such as the surface of a body on which a vehicle associated with the flash LADAR based system 100 seeks to land (step 1060). The light reflected off of the surface is received at a plurality of pixels 608 of the three-dimensional FPA 212 (step 1064). Receiving light at a plurality of pixels can include receiving light at all or most of the pixels 608 of the detector array 212. In addition to valid signals, noise may be sensed at each pixel 608. In order to remove noise, signals determined to be invalid can be discarded, and a value obtained by averaging neighbor pixel values can be substituted therefor. For each of the plurality of pixels 608, a time of flight between generating the broad beam of light and receiving reflected light at the pixels 608 of the three-dimensional FPA is determined, to obtain range information with respect to each of the plurality of pixels 608 (step 1068). The velocity of the flash LADAR system relative to the surface from which the light is reflected is then determined by comparing a first frame of range information to a second frame of range information obtained by the flash LADAR based system 100 (step 1072). Moreover, the velocity of the vehicle carrying the flash LADAR system 100 relative to the surface can be determined in X, Y and Z directions; X and Y determined from 2D correlations of range image features in the subsequent frames, and z directly from the change in range at each pixel averaged over an appropriate field of one or more pixels.

After determining a velocity at step 1072, or after determining that the flash LADAR 234 should not be operated in a velocimetry mode at step 652, a determination may be made as to whether the flash LADAR 234 should be operated in a hazard detection and avoidance mode (step 1076). A hazard detection and avoidance mode is typically entered when the flash LADAR based system 100 is relatively close to a surface comprising a landing site. In the HDA mode, a broad beam of light is generated using the light source 228 (step 1080). The broad beam of light is reflected off of the surface comprising a landing site (step 1084), and the reflected light is received at a plurality of pixels 608 of the three-dimensional FPA 212 (step 1088). For each of the plurality of pixels 608, a time of flight between generating the beam of light and receiving the reflected light at the pixels 608 of the three-dimensional FPA 212 is determined to obtain range information with respect to each of the plurality of pixels (step 1092). In this way, a detailed elevation map of the landing surface is generated. Moreover, as the LADAR based system gets closer to the landing surface, the area covered for a given field of view is reduced, while resolution is increased. Alternatively, the zoom optics can be used to keep the resolution constant. This map can then be processed to identify surface features that present a hazard to the vehicle carrying the flash LADAR system.

As can be appreciated by one of skill in the art, simultaneous operation in velocimetry and HDA modes is enabled by the present invention. Accordingly, the same flash LADAR based system 100, and in particular the same light source 228 and three-dimensional FPA 212 can provide signals to processing units or functions so that velocity and image information for HDA operations are provided simultaneously. In accordance with embodiments of the present invention, the flash LADAR based system operates at a frame rate of at least 30 Hz, to provide a video image of the landing surface. In addition, images obtained while in velocimetry and/or HDA modes can be matched to images that have been previously collected to determine relative location information.

After operating the flash LADAR 234 in a hazard detection and avoidance mode, or after determining that the flash LADAR 234 should not be operated in a hazard detection and avoidance mode, a determination may be made as to whether operation of the flash LADAR 234 should be continued. If it is determined that operation of the flash LADAR 234 should be continued, the process may return to step 1052. If it is determined that operation should be discontinued, the process may end.

In addition, if available, global positioning system (GPS) coordinates and/or inertial measurement unit (IMU) information can be associated with each frame of data collected by the flash LADAR system 100. Accordingly, absolute or geolocation information can be associated with data collected by the flash LADAR system 100.

Passive imaging can also be used in combination with flash LADAR data to achieve seamless navigation sensing from distances beyond the LADAR range to landing. The combination of passive imaging with flash LADAR data is facilitated by the use of a coboresighted device. Flash LADAR information can also be used to eliminate scale ambiguity in passive images when performing TRN using passive image databases.

Although certain examples of embodiments of the described flash LADAR system 100 discussed herein involve scenarios in which a space vehicle is landing on a planet or other body, embodiments of the present invention are not so limited. For example, a flash LADAR system 100 in accordance with embodiments of the present invention may be used in connection with an airborne vehicle, such as a helicopter. When deployed on a helicopter, the flash LADAR system 100 can provide the altimeter, terrain relative navigation, velocimetry, and hazard detection and avoidance modes, as in other embodiments. In addition, all embodiments of the present invention can provide dust penetration features. In particular, although the returned grounds signal is attenuated by the obscurant (e.g., the dust), the reflection from the ground will be the last return above the noise floor of the detector. Accordingly, the sensor can ignore any intensity samples that occur before a reflection from the ground is received. In this way, penetration by the transmitted light through the obscurant, whether it be dust, snow, camouflage, or foliage, makes it possible for the LADAR system 100 to provide an image of the landing surface.

In accordance with exemplary embodiments of the present invention, the instantaneous field of regard (IFOR) of the flash LADAR system 100 may be 3°×3° when operated in a flash mode utilizing all or most of the pixels of the three-dimensional FPA 212. The field of regard (FOR) when utilizing the optional scanner may be increased to 20°×20°. The range resolution may be one centimeter and the range precision three centimeters plus or minus one standard deviation (σ) on each acquired frame. The absolute range accuracy may equal the range precision, plus or minus one centimeter. The system may operate at a frame rate of 0 to 30 Hz. The aperture of the optical assembly 304 associated with the transmission of light may be 11 cm. Each pixel 608 of the three-dimensional FPA 212 may have a field of view of 0.0172°×0.0172°. The three-dimensional FPA 212 may comprise 128×128 pixels, and produce images comprising 128×128 pixels per frame. The laser light source 228 may comprise a Nd:YAG, diode-pumped, passive Q-Switch laser with a pulse energy of 40 mJ/pulse, a pulse repetition frequency of 30 Hz, and a wavelength of 1,064 nm (or optionally 1,557 nm). The complete system may have an operating range from 2 meters to 100 kilometers. In altimetry mode, the laser divergence is reduced to illuminate only a 2×2 array of pixels to allow a range of greater than 65 kilometer altitude for a 7% diffuse reflectivity surface, and to greater than 160 kilometers for higher reflectivity or on select shots. In addition, intermediate beam divergence amounts may be utilized to obtain acceptable imaging performance for less than a full array at longer ranges than possible with full array illumination. For example, at a range of 4 kilometers, an 80×80 pixel area of the detector array may be utilized as an intermediate beam divergence amount. The optional scanner need not be very precisely controlled since all pixels in the image are moved at once. Accordingly, co-registering adjacent images to create the full area maps by correlating the range profiles at their edges is relatively straight forward and accurate. The scanner can extend the LADAR field of regard to approximately 20×20°. When used in the altimeter mode, this scanning mirror flips out of the LADAR path to allow viewing the terrain beneath the land or directly.

Auxiliary location data can be integrated with data from the flash LADAR and/or passive image data to fill in and filter the flash and passive image data to calculate smooth, continuous and accurate position and velocity data. Hazard maps can be created from the acquisition, identification and tracking of hazards based on flash LADAR data and/or passive imager data while the vehicle carrying the flash LADAR and passive imager is in transit. Embodiments of the present invention can also incorporate other sensors and range imaging methods, such as frequency modulated continuous wave (FMCW) coherent detection and Geiger mode range imaging in which multiple "flashes" may be required to achieve a single image. Flash image redirection can also be used to accommodate larger fields of view or intelligent image acquisition based on scene and application.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A LADAR system, comprising:
   a common receive aperture;
   a first optical sensor, wherein the first optical sensor is a three-dimensional focal plane array that receives a signal from the common receive aperture;
   a second optical sensor, wherein the second optical sensor is a two-dimensional focal plane array that receives a signal from the common receive aperture;
   shared electronics, wherein the first optical sensor and the second optical sensor are interconnected to the shared electronics.

2. The system of claim 1, further comprising:
   a first beam splitter, wherein a received signal collected by the common receive aperture is divided into a first signal component and a second signal component by the first beam splitter, wherein the first signal component is provided to the first optical sensor, and wherein at least a portion of the second signal component is provided to the second optical sensor.

3. The system of claim 2, wherein the first beam splitter is a dichroic element, and wherein the first and second signal components include different signal wavelengths.

4. The system of claim 1, further comprising:
   a third optical sensor, wherein the third optical sensor is a two-dimensional focal plane array.

5. The system of claim 4, wherein the third optical sensor operates in conjunction with a star tracker function.

6. The system of claim 4, wherein the third optical sensor receives a signal from a second receive aperture that is not aligned with the first and generally orthogonal.

7. The system of claim 4, further comprising:
a star tracker optic, wherein the third optical sensor is provided with a signal from the star tracker optic.

8. The system of claim 1, further comprising:
a light source;
transmit optics, wherein the transmit optics are operable to transmit a beam received from the light source.

9. The system of claim 8, further comprising:
a beam steering element, wherein the beam steering element is operable to selectively steer the beam transmitted by the transmit optics.

10. The system of claim 8, wherein the light source comprises a pulsed laser, pulsed for pulsed-mode operation and continuous-wave for continuous-mode operation.

11. The system of claim 1, further comprising:
an enclosure, wherein the first optical sensor, the second optical sensor, and the shared electronics are housed within the first enclosure.

12. The system of claim 1, wherein the shared electronics comprise a field programmable gate array.

13. The system of claim 1, wherein the common receiver aperture includes a zoom optic.

14. The system of claim 1, wherein for a frame of data for the three dimensional focal plane and for a corresponding frame of two-dimensional data a geolocation and pointing direction is associated.

15. The system of claim 1, further comprising:
A common processor, wherein the common processor provides at least one of dark count subtraction, background light subtraction, noise filtering, temporal centroiding, orthorectification, interpolation, and averaging.

16. A sensor system, comprising:
a shared receive aperture, including:
receive optics;
intensity control elements;
filters;
a primary dichroic mirror, wherein the dichroic mirror is in the optical path of the shared receive aperture and receives received signal light from the shared receive aperture;
a three-dimensional focal plane array, wherein a first component of the received signal light within a first range of wavelengths is a first one of passed by or reflected to the three-dimensional focal plane array by the dichroic mirror;
an imaging two-dimensional focal plane array, wherein at least a portion of a second component of the received signal light within a second range of wavelengths is a second one of passed by or reflected to the imaging two-dimensional array by the dichroic mirror;
a laser light source;
transmit optics, wherein the transmit optics receive light produced by the laser light source;
shared electronics, wherein the shared electronics are interconnected to and control operation of at least the intensity control elements, the three-dimensional focal plane array, the imaging two-dimensional focal plane array, and the laser light source;
a shared enclosure, wherein the primary dichroic mirror, the three-dimensional focal plane array, the imaging two-dimensional focal plane array, laser light source, and the shared electronics are housed in the shared enclosure, and wherein the shared receive aperture and the transmit optics are mounted to the shared enclosure.

17. The system of claim 16, further comprising:
a two-dimensional star tracker array.

18. The system of claim 17, further comprising:
a star tracker optic, wherein a signal from the star tracker optic is received by the two-dimensional star tracker array.

19. The system of claim 16, wherein the system provides sensory data for TRN, HRD, and velocimetry.

20. A method for operating a flash LADAR system, comprising:
first transmitting a laser beam;
receiving a reflected return signal from a target at a shared receive aperture;
directing the reflected return signal to a three-dimensional focal plane array;
receiving a passive signal at the shared receive aperture, wherein at least some of the passive return signal is received at the same time as the reflected return signal;
directing the passive return signal to a two-dimensional focal plane array;
obtaining a frame of three-dimensional image information;
obtaining a frame of two-dimensional image information within a time at which the frame of three-dimensional image information is obtained;
obtaining absolute position information;
combining the frame of three-dimensional image information with the frame of two-dimensional image information to obtain a combined frame;
associating the absolute position information with the combined frame;
after associating the absolute position information with the combined frame, second transmitting a laser beam, wherein the first transmitting a laser beam and the second transmitting a laser beam is separated in time by no more than 1/30 th of a second.

* * * * *